(12) United States Patent
Ouderkirk et al.

(10) Patent No.: US 7,773,834 B2
(45) Date of Patent: Aug. 10, 2010

(54) MULTILAYER POLARIZING FIBERS AND POLARIZERS USING SAME

(75) Inventors: Andrew J. Ouderkirk, Woodbury, MN (US); Gregory L. Bluem, St. Paul, MN (US); Robert L. Brott, Woodbury, MN (US); Patrick R. Fleming, Lake Elmo, MN (US); Joan M. Frankel, Woodbury, MN (US); Shandon D. Hart, Maplewood, MN (US); William J. Kopecky, Hudson, WI (US); Huiwen Tai, Woodbury, MN (US); Margaret M. Vogel-Martin, Forest Lake, MN (US); Daniel J. Zillig, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 843 days.

(21) Appl. No.: 11/468,746

(22) Filed: Aug. 30, 2006

(65) Prior Publication Data
US 2009/0251776 A1    Oct. 8, 2009

(51) Int. Cl.
G02B 6/00    (2006.01)
(52) U.S. Cl. .................... 385/11; 385/122; 385/123; 385/126; 385/127; 385/128; 385/131; 385/141
(58) Field of Classification Search .................. 385/11, 385/131, 14, 122, 123, 126, 127, 128, 129, 385/130, 141, 146; 428/212; 349/194, 96, 349/87; 359/483, 484, 486, 489, 492, 494, 359/497, 500
See application file for complete search history.

(56) References Cited

U.S. PATENT DOCUMENTS

| | | | |
|---|---|---|---|
| 2,403,731 A | 7/1946 | MacNeile |
| 2,604,817 A | 7/1952 | Schupp, Jr. |
| 2,687,673 A | 8/1954 | Boone |
| 3,164,563 A | 1/1965 | Maxwell et al. |
| 3,308,508 A | 3/1967 | Schrenk |
| 3,510,447 A | 5/1970 | Bourgnignon |

(Continued)

FOREIGN PATENT DOCUMENTS

EP    1 006 221    6/2000

(Continued)

OTHER PUBLICATIONS

Benoit, et al., "Static and Dynamic Properties of Optical Microcavities in Photonic Bandgap Yarns," *Advanced Materials*, vol. 15, No. 24, pp. 2053-2056 (Dec. 17, 2003).

(Continued)

*Primary Examiner*—Brian M Healy
(74) *Attorney, Agent, or Firm*—Jay R. Pralle

(57) ABSTRACT

A polarizing film is made of multilayer polarizing fibers embedded within a matrix. The fibers are formed with layers of at least a first and a second polymer material. Layers of the first polymer material are disposed between layers of the second polymer material. At least one of the first and second polymer materials is birefringent. In some embodiments the thickness of the layers of at least one of the materials varies across the fiber, and may include layers are selected as quarter-wavelength thickness for light having a wavelength of more than 700 nm.

29 Claims, 12 Drawing Sheets

U.S. PATENT DOCUMENTS

| | | |
|---|---|---|
| 3,565,985 A | 2/1971 | Schrenk et al. |
| 3,576,707 A | 4/1971 | Schrenk et al. |
| 3,607,509 A | 9/1971 | Schrenk |
| 3,647,612 A | 3/1972 | Schrenk et al. |
| 3,746,485 A | 7/1973 | Schrenk |
| 3,759,647 A | 9/1973 | Schrenk et al. |
| 3,801,429 A | 4/1974 | Schrenk et al. |
| 4,019,844 A | 4/1977 | Ogasawara et al. |
| 4,344,906 A | 8/1982 | Kitagawa et al. |
| 4,357,389 A | 11/1982 | Satoh et al. |
| 4,477,522 A | 10/1984 | Sheehan |
| 4,525,413 A * | 6/1985 | Rogers et al. ............... 428/212 |
| 4,560,411 A | 12/1985 | Melchoir |
| 4,963,151 A | 10/1990 | Ducheyne et al. |
| 5,039,566 A | 8/1991 | Skubic et al. |
| 5,047,288 A | 9/1991 | Hoshiro et al. |
| 5,059,482 A | 10/1991 | Kawamoto et al. |
| 5,175,030 A | 12/1992 | Lu et al. |
| 5,183,597 A | 2/1993 | Lu |
| 5,202,574 A | 4/1993 | Fu et al. |
| 5,217,794 A | 6/1993 | Schrenk |
| 5,251,065 A | 10/1993 | Uetsuki |
| 5,269,995 A | 12/1993 | Ramanathan et al. |
| 5,316,703 A | 5/1994 | Schrenk |
| 5,380,479 A | 1/1995 | Schrenk et al. |
| 5,389,324 A | 2/1995 | Lewis et al. |
| 5,428,098 A | 6/1995 | Brekner et al. |
| 5,444,570 A | 8/1995 | Uetsuki |
| 5,612,820 A | 3/1997 | Schrenk et al. |
| 5,629,055 A | 5/1997 | Revol et al. |
| 5,665,450 A | 9/1997 | Day et al. |
| 5,751,388 A | 5/1998 | Larson |
| 5,753,277 A | 5/1998 | Kikutani et al. |
| 5,783,120 A | 7/1998 | Ouderkirk et al. |
| 5,793,456 A | 8/1998 | Broer et al. |
| 5,807,458 A | 9/1998 | Sanders et al. |
| 5,825,543 A | 10/1998 | Ouderkirk et al. |
| 5,828,488 A | 10/1998 | Ouderkirk et al. |
| 5,867,316 A | 2/1999 | Carlson et al. |
| 5,877,829 A | 3/1999 | Okamoto et al. |
| 5,881,196 A | 3/1999 | Phillips ...................... 385/127 |
| 5,882,774 A | 3/1999 | Jonza et al. |
| 5,932,626 A | 8/1999 | Fong et al. |
| 5,999,239 A | 12/1999 | Larson |
| 6,075,915 A | 6/2000 | Koops |
| 6,111,696 A | 8/2000 | Allen et al. |
| 6,139,626 A | 10/2000 | Norris et al. |
| 6,141,149 A | 10/2000 | Carlson et al. |
| 6,239,907 B1 | 5/2001 | Allen et al. |
| 6,243,521 B1 | 6/2001 | Owaki et al. |
| 6,301,421 B1 | 10/2001 | Wickham et al. |
| 6,310,671 B1 | 10/2001 | Larson |
| 6,322,236 B1 | 11/2001 | Campbell et al. |
| 6,326,094 B1 | 12/2001 | Asano et al. |
| 6,335,094 B1 | 1/2002 | Owaki et al. |
| 6,387,488 B1 | 5/2002 | Kumazawa et al. |
| 6,430,348 B1 | 8/2002 | Asano et al. |
| 6,433,919 B1 | 8/2002 | Chowdhury et al. |
| 6,498,869 B1 | 12/2002 | Yao |
| 6,529,676 B2 | 3/2003 | Eggleton et al. |
| 6,542,681 B2 | 4/2003 | Broeng et al. |
| 6,542,682 B2 | 4/2003 | Cotteverte et al. |
| 6,577,446 B2 | 6/2003 | Kumazawa et al. |
| 6,583,930 B1 | 6/2003 | Schrenk et al. |
| 6,674,949 B2 | 1/2004 | Allan et al. |
| 6,813,399 B2 | 11/2004 | Hamada |
| 6,844,950 B2 | 1/2005 | Ja Chisholm et al. |
| 6,846,089 B2 | 1/2005 | Stevenson et al. |
| 6,876,796 B2 | 4/2005 | Garita et al. |
| 6,881,288 B2 | 4/2005 | Davies et al. |
| 6,930,820 B1 | 8/2005 | Shooks, Jr. et al. |
| 6,974,618 B2 | 12/2005 | Kumacheva et al. ....... 428/64.1 |
| 7,016,576 B2 | 3/2006 | Cocchini et al. |
| 7,052,762 B2 | 5/2006 | Hebrink et al. |
| 7,082,147 B2 | 7/2006 | Spoonhower et al. |
| 7,167,622 B2 | 1/2007 | Temelkuran et al. |
| 7,231,122 B2 | 6/2007 | Weisberg et al. |
| 7,272,285 B2 | 9/2007 | Benoit et al. |
| 7,295,734 B2 | 11/2007 | Bayindir et al. |
| 7,311,962 B2 | 12/2007 | Fink et al. |
| 7,327,923 B2 * | 2/2008 | Hart et al. .................... 385/126 |
| 2001/0012149 A1 | 8/2001 | Lin et al. |
| 2001/0022982 A1 | 9/2001 | Neavin et al. |
| 2002/0090188 A1 | 7/2002 | Lazarev et al. |
| 2002/0130988 A1 | 9/2002 | Crawford et al. |
| 2002/0131737 A1 | 9/2002 | Broeng et al. |
| 2002/0135880 A1 | 9/2002 | Fink et al. |
| 2002/0154403 A1 | 10/2002 | Trotter, Jr. |
| 2002/0155592 A1 | 10/2002 | Kelleher et al. |
| 2002/0159019 A1 | 10/2002 | Pokorny et al. |
| 2002/0181911 A1 | 12/2002 | Wadsworth et al. |
| 2003/0031438 A1 | 2/2003 | Kambe et al. |
| 2003/0031846 A1 | 2/2003 | Kumazawa et al. |
| 2003/0031852 A1 | 2/2003 | Fink et al. |
| 2003/0035972 A1 | 2/2003 | Hanson et al. |
| 2003/0118805 A1 | 6/2003 | Kretman et al. |
| 2003/0218704 A1 | 11/2003 | Lee et al. |
| 2004/0012118 A1 | 1/2004 | Perez et al. |
| 2004/0012855 A1 | 1/2004 | Allen et al. |
| 2004/0031435 A1 | 2/2004 | Park |
| 2004/0052484 A1 | 3/2004 | Broeng et al. |
| 2004/0062934 A1 | 4/2004 | Miller et al. |
| 2004/0081412 A1 | 4/2004 | Cocchini et al. |
| 2004/0096172 A1 | 5/2004 | Bongrand et al. |
| 2004/0126592 A1 | 7/2004 | Shibahara et al. |
| 2004/0132867 A1 | 7/2004 | Shibahara et al. |
| 2004/0175084 A1 | 9/2004 | Broeng et al. |
| 2004/0179803 A1 | 9/2004 | Bourelle |
| 2004/0223715 A1 | 11/2004 | Benoit et al. |
| 2004/0228778 A1 | 11/2004 | Murari et al. |
| 2005/0053345 A1 | 3/2005 | Bayindir et al. |
| 2005/0129877 A1 | 6/2005 | Akada et al. |
| 2005/0147366 A1 | 7/2005 | Large et al. |
| 2005/0169339 A1 | 8/2005 | Cumbo |
| 2005/0201655 A1 | 9/2005 | Ellwood, Jr. |
| 2005/0201674 A1 | 9/2005 | Ellwood, Jr. |
| 2005/0201715 A1 | 9/2005 | Ellwood, Jr. |
| 2005/0226579 A1 | 10/2005 | Fink et al. |
| 2005/0259933 A1 | 11/2005 | Temelkuran et al. |
| 2005/0259934 A1 | 11/2005 | Temelkuran et al. |
| 2005/0259942 A1 | 11/2005 | Temelkuran et al. |
| 2005/0271340 A1 | 12/2005 | Weisberg et al. |
| 2006/0001358 A1 | 1/2006 | Onishi |
| 2006/0007371 A1 | 1/2006 | Miyatake et al. |
| 2006/0029343 A1 | 2/2006 | Farroni et al. |
| 2006/0114563 A1 | 6/2006 | Allen et al. |
| 2006/0139948 A1 | 6/2006 | Huck et al. |
| 2006/0193577 A1 | 8/2006 | Ouderkirk et al. |
| 2006/0193578 A1 | 8/2006 | Ouderkirk et al. |
| 2006/0193582 A1 | 8/2006 | Ouderkirk et al. |
| 2006/0193593 A1 | 8/2006 | Ouderkirk et al. |
| 2006/0194046 A1 | 8/2006 | Ouderkirk et al. |
| 2006/0194487 A1 | 8/2006 | Ouderkirk et al. |
| 2006/0257678 A1 | 11/2006 | Benson, Jr. et al. |
| 2007/0019917 A1 | 1/2007 | Bayindir et al. ............. 385/123 |
| 2007/0031097 A1 | 2/2007 | Heikenfeld et al. |
| 2007/0042168 A1 | 2/2007 | Harada et al. |
| 2007/0122096 A1 | 5/2007 | Temelkuran et al. |
| 2007/0153162 A1 | 7/2007 | Wright et al. |
| 2007/0230883 A1 * | 10/2007 | Hart et al. .................... 385/123 |
| 2007/0236938 A1 | 10/2007 | Ouderkirk et al. |
| 2007/0236939 A1 | 10/2007 | Ouderkirk et al. |

| | | |
|---|---|---|
| 2007/0237938 A1 | 10/2007 | Ouderkirk et al. |

FOREIGN PATENT DOCUMENTS

| | | |
|---|---|---|
| EP | 1 008 440 | 6/2000 |
| EP | 1072637 | 1/2001 |
| EP | 1 149 942 | 10/2001 |
| EP | 1 162 059 | 12/2001 |
| EP | 1 258 749 | 11/2002 |
| EP | 1477529 | 11/2004 |
| EP | 0 942 301 | 2/2008 |
| GB | 1126774 | 9/1968 |
| JP | 54-078787 | 6/1979 |
| JP | 05-070627 | 3/1993 |
| JP | 5-113606 | 5/1993 |
| JP | 09311205 | 2/1997 |
| JP | 10-036655 | 2/1998 |
| JP | 11124747 | 5/1999 |
| JP | 2000/52399 | 2/2000 |
| JP | 2000/239541 | 9/2000 |
| JP | 2001/031774 | 2/2001 |
| JP | 2002/0131737 | 5/2002 |
| JP | 2004/051960 | 2/2004 |
| JP | 2004/114617 | 4/2004 |
| JP | 03-544264 | 7/2004 |
| JP | 2004/277657 | 10/2004 |
| JP | 2004/315544 | 11/2004 |
| JP | 2005/133028 | 5/2005 |
| JP | 2005/326492 | 11/2005 |
| WO | WO 96/30203 | 10/1996 |
| WO | WO 97/32224 | 9/1997 |
| WO | WO 99/18268 | 4/1999 |
| WO | WO 99/64904 | 12/1999 |
| WO | WO 02/31053 | 4/2002 |
| WO | WO 02/48757 | 6/2002 |
| WO | WO 02/062877 | 8/2002 |
| WO | WO 03/062909 | 7/2003 |
| WO | WO 2004/046777 | 6/2004 |
| WO | WO 2004/070464 | 8/2004 |
| WO | WO 2004/077935 | 9/2004 |
| WO | WO 2006/093660 | 9/2006 |
| WO | WO 2006/093775 | 9/2006 |
| WO | WO 2007/042177 | 4/2007 |

OTHER PUBLICATIONS

T. F. Cooke, "Bicomponent Fibers," *Handbook of Fiber Science and Technology*: vol. 3, *High Technology Fibers Part D*, ; Marcel Dekker, ISBN 0-8247-9470-2, 1996, pp. 247-280.

Dugan et al., "Synthetic Split Microfiber Technology for Filtration" Fiber Innovation Technologies and Edward C. Homonoff & Associates, LLC, Filtration 2000 Conference, Philadelphia, PA, Nov. 2000, 9 pgs.

Hagewood et al., Hills Inc., Barrier Fabrics of Spunbond Specialty Fibers for Medica . . . , "Production of Sub-micron Fibers in Non-Woven Fabric", <http://www.hillsinc.net/submicron%20.shtml>, printed from the internet on Oct. 1, 2003, p. 7.

Hart, et al., "External Reflection from Omnidirectional Dielectric Mirror Fibers," *Science*, vol. 296, pp. 510-513 (Apr. 19, 2002).

Jonza et al., "Multilayer Polymeric Color-shifting Polarizer Films", Optical Security and Counterfeit Deterrence Techniques V, Proceedings of SPIE-IS&T Electronic Imaging, SPIE vol. 5310, 2004.

Kim, GeunHyung, "A PMMA composite as an optical diffuse in a liquid crystal display backlighting unit," *Science Direct, European Polymer Journal*, vol. 41, pp. 1729-1737 (2005).

Kim et al., "Analysis of thermo-physical and optical properties of a diffuser using PET/PC/PBT copolymer in LCD backlight units," *Science Direct*—Displays 26, pp. 37-43 (2005).

"King and Company—Glossary of Fabric and Textile Jargon" <http://www.kingandco.com/glossary/>, printed from internet on Oct. 1, 2003, 6 pgs.

W.D. Kingery, et al., Massachusetts Institute of Technology, *Introduction to Ceramics, 2nd Edition*, John Wiley and Sons, 1976, pp. 368-374.

Kuriki, et al., "Hollow multilayer photonic bandgap fibers for NIR applications," *Optics Express*, vol. 12, No. 8, pp. 1510-1517 (Apr. 2004).

Li et al., "In-Situ Microgibrillar PET/iPP Blend via Slit Die Extrusion, Hot Stretching, and Quenching: Influence of Hot Stretch Ratio on Morphology, Crystallization, and Crystal Structure of iPP at a Fixed PET Concentration", Journal of Polymer Science: Polymer Physics, vol. 42, pp. 4095-4106, 2004.

A. Paul, *Chemistry of Glasses, 2nd Edition*, Chapman and Hall, 1990, pp. 41-49.

The Texemart Times, "Texemart News—Features Section, Recent Advancements in Man-made Textiles: Microfibres", <http://www.texemart.com/news/narchive/archivedec5.asp>, Printed from the internet on Oct. 1, 2003, p. 3.

Weber et al., "Giant Birefringent Optics in Multilayer Polymer Mirrors", Science, vol. 287, Mar. 31, 2000.

U.S. Appl. No. 11/278,358, "Spiral Multilayer Fibers", filed Mar. 31, 2006.

U.S. Appl. No. 11/468,737, titled Optical Devices Containing Birefringent Polymer Fibers, filed Aug. 30, 2006.

U.S. Appl. No. 11/468,743, titled Polymer Fiber Polarizers with Aligned Fibers, filed Aug. 30, 2006.

U.S. Appl. No. 11/468,740, titled Polymer Fiber Polarizers, filed Aug. 30, 2006.

\* cited by examiner

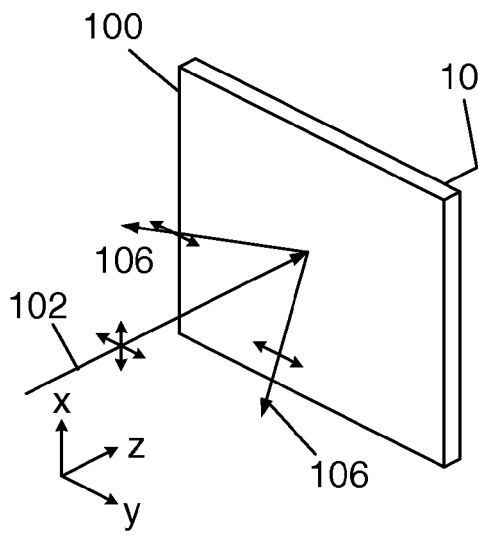
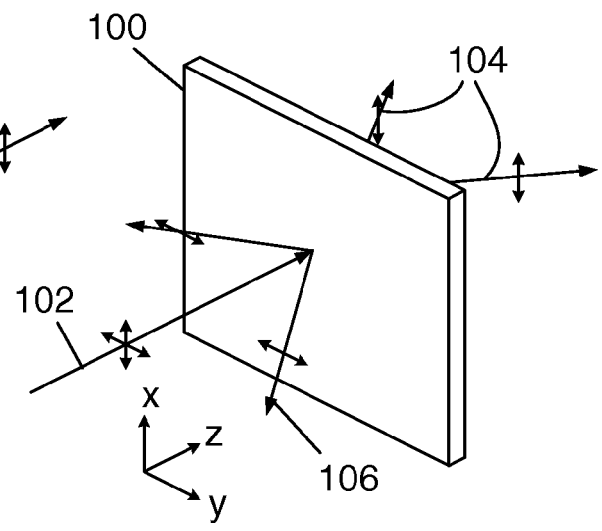
*FIG. 1A*  *FIG. 1B*
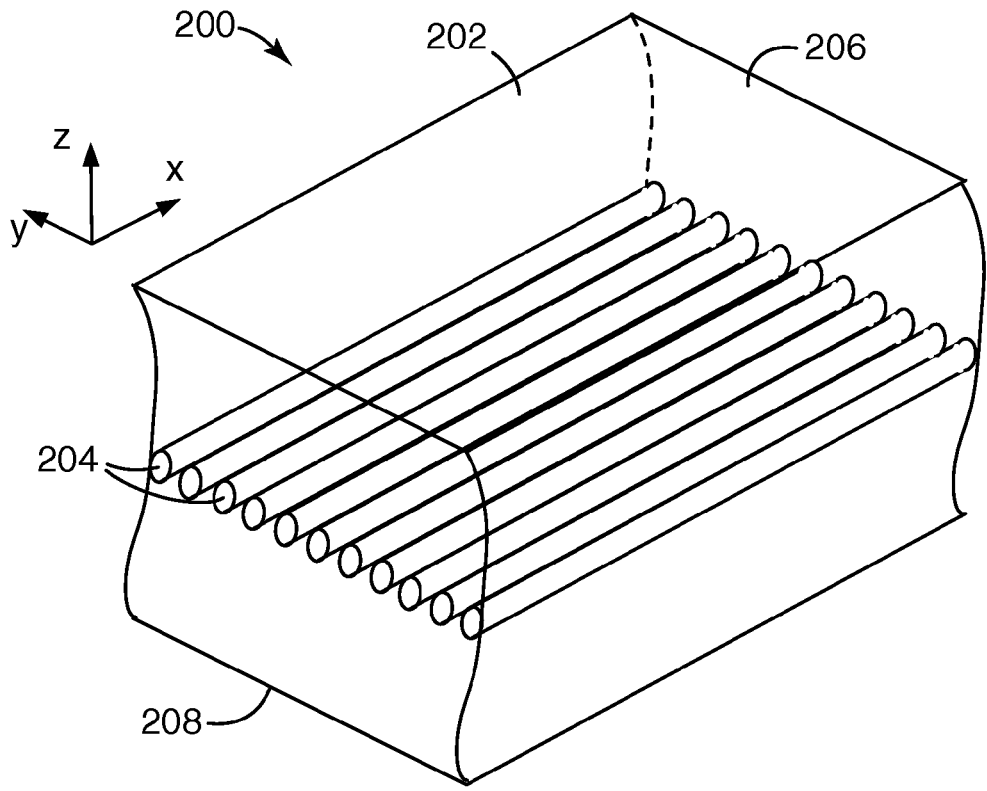
*FIG. 2*

MULTILAYER POLARIZING FIBERS AND POLARIZERS USING SAME

FIELD OF THE INVENTION

The invention relates to optical display systems, and more particularly to optical display films that contain optical elements that include birefringent polymeric fibers that are illuminated transversely.

BACKGROUND

Several different kinds of polarizing film are available for polarizing unpolarized light. Absorbing (dichroic) polarizers have, as an inclusion phase, polarization-dependent absorbing species, often an iodine-containing chain, that are aligned within a polymer matrix. Such a film absorbs light polarized with its electric field vector aligned parallel to absorbing species and transmits light polarized perpendicular to the absorbing species. Another type of polarizing film is a reflective polarizer, which separates light in different polarization states by transmitting light in one state and reflecting light in the other state. One type of reflective polarizer is a multilayer optical film (MOF), which is formed of a stack of many layers of alternating polymer materials. One of the materials is optically isotropic while the other is birefringent, with one of its refractive indices matched to that of the isotropic material. Light incident in one polarization state experiences the matched refractive indices and is substantially specularly transmitted through the polarizer. Light incident in the other polarization state, however, experiences multiple coherent or incoherent reflections at the interfaces between the different layers and is reflected by the polarizer.

Another type of reflective polarizing film is constructed from inclusions dispersed within a continuous phase matrix. The inclusions are small relative to the width and height of the film. The characteristics of these inclusions can be manipulated to provide a range of reflective and transmissive properties to the film. The inclusions constitute a disperse polymer phase within the continuous phase matrix. The inclusion size and alignment can be altered by stretching the film. Either the continuous phase or the disperse phase is birefringent, with one of the refractive indices of the birefringent material matching to the refractive index of the other phase, which is optically isotropic. Selection of the materials for the continuous and disperse phases, along with the degree of stretching, can affect the degree of birefringent refractive index mismatch between the disperse phase and the continuous phase. Other characteristics can be adjusted to improve the optical performance.

SUMMARY OF THE INVENTION

One embodiment of the invention is directed to an optical body that has a first multilayered fiber comprising layers of at least a first and a second polymer material. Layers of the first polymer material are disposed between layers of the second polymer material. At least one of the first and second polymer materials is birefringent. At least a first layer of the first polymer material has a first thickness different from a second layer of the first polymer material.

Another embodiment of the invention is directed to an optical body that includes a first multilayered fiber comprising layers of at least a first and a second polymer material. Layers of the first polymer material are disposed between layers of the second polymer material. At least one of the first and second polymer materials is birefringent. At least some of the layers of first and second polymer materials have a thickness selected as a quarter-wavelength thickness for light having a wavelength of more than 700 nm.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIGS. 1A and 1B schematically illustrate the operation of a polarizer film;

FIG. 2 schematically illustrates a cut-away view of an embodiment of a polymer layer according to principles of the present invention;

Figure 3A:
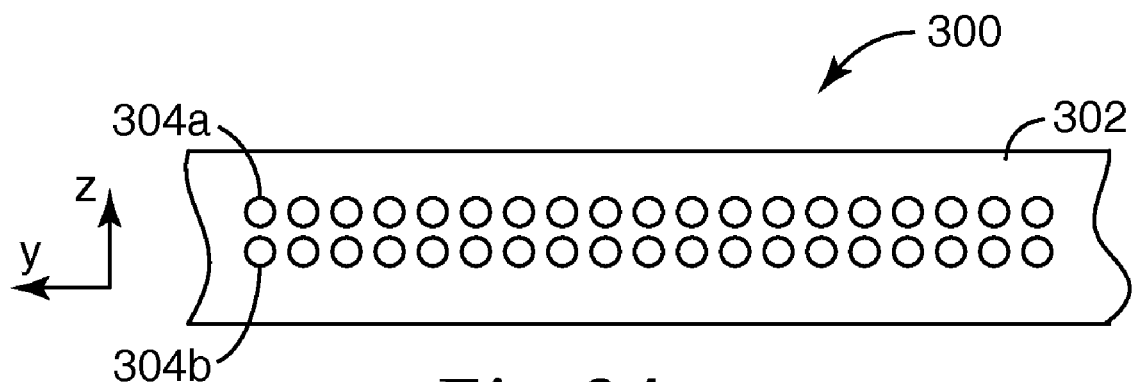
FIGS. 3A-3C schematically illustrate cross-sectional views through embodiments of polarizer films according to principles of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is applicable to optical systems and is more particularly applicable to polarized optical systems. A new type of reflective polarizing film is the fiber polarizing film, which is a matrix layer that contains multiple fibers having internal birefringent interfaces, i.e. interfaces between a birefringent material and another material. It is important that the parameters of the fibers in a fiber polarizer film are selected so as to give improved polarization characteristics.

As used herein, the terms "specular reflection" and "specular reflectance" refer to the reflectance of light rays from a body where the angle of reflection is substantially equal to the angle of incidence, where the angles are measured relative to a normal to the body's surface. In other words, when the light is incident on the body with a particular angular distribution, the reflected light has substantially the same angular distribution. The terms "diffuse reflection" or "diffuse reflectance" refer to the reflection of rays where the angle of some of the reflected light is not equal to the angle of incidence. Consequently, when light is incident on the body with a particular angular distribution, the angular distribution of the reflected light is different from that of the incident light. The terms "total reflectance" or "total reflection" refer to the combined reflectance of all light, specular and diffuse.

Similarly, the terms "specular transmission" and "specular transmittance" are used herein in refer to the transmission of light through a body where the angular distribution of the transmitted light, adjusted for any change due to Snell's law, is substantially the same as that of the incident light. The terms "diffuse transmission" and "diffuse transmittance" are used to describe the transmission of light through a body, where the transmitted light has an angular distribution that is different from the angular distribution of the incident light. The terms "total transmission" or "total transmittance" refer to the combined transmission of all light, specular and diffuse.

A reflective polarizer film 100 is schematically illustrated in FIGS. 1A and 1B. In the convention adopted herein, the thickness direction of the film is taken as the z-axis, and x-y plane is parallel to the plane of the film. When unpolarized light 102 is incident on the polarizer film 100, the light 104 polarized parallel to the transmission axis of the polarizer film 100 is substantially transmitted, while the light 106 polarized parallel to the reflection axis of the polarizer film 100 is substantially reflected. The angular distribution of the reflected light is dependent on various characteristics of the polarizer 100. For example, in some exemplary embodiments the light 106 may be diffusely reflected, as is schematically illustrated in FIG. 1A. In other embodiments, the reflected light may include both specular and diffuse components, while in some embodiments, the reflection may be substantially all specular. In the embodiment illustrated in FIG. 1A, the transmission axis of the polarizer is parallel to the x-axis and the reflection axis of the polarizer 100 is parallel to the y-axis. In other embodiments, these may be reversed. The transmitted light 104 may be specularly transmitted, for example as is schematically illustrated in FIG. 1A, may be diffusely transmitted, for example as is schematically illustrated in FIG. 1B, or may be transmitted with a combination of specular and diffuse components. A polarizer substantially diffusely transmits light when over one half of the transmitted light is diffusely transmitted and substantially specularly transmits light when over one half of the transmitted light is specularly transmitted.

A cut-away view through a reflective polarizer body according to an exemplary embodiment of the present invention is schematically presented in FIG. 2. The body 200 comprises a polymer matrix 202, also referred to as a continuous phase. The polymer matrix may be optically isotropic or optically birefringent. For example, the polymer matrix may be uniaxially or biaxially birefringent, meaning that the refractive index of the polymer may be different along one direction and similar in two orthogonal directions (uniaxial) or different in all three orthogonal directions (biaxial).

Polarizing fibers 204 are disposed within the matrix 202. The polarizing fibers 204 comprise at least two polymer materials, at least one of which is birefringent. In some exemplary embodiments, one of the materials is birefringent while the other material, or materials, is/are isotropic. In other embodiments, two or more of the materials forming the fiber are birefringent. In some embodiments, fibers formed of isotropic materials may also be present within the matrix 202.

The refractive indices in the x-, y-, and z-directions for the first fiber material may be referred to as $n_{1x}$, $n_{1y}$ and $n_{1z}$, and the refractive indices in the x-, y-, and z-directions for the second fiber material may be referred to as $n_{2x}$, $n_{2y}$ and $n_{2z}$. Where the material is isotropic, the x-, y-, and z-refractive indices are all substantially matched. Where the first fiber material is birefringent, at least one of the x-, y- and z-refractive indices is different from the others.

Within each fiber 204 there are multiple interfaces formed between the first fiber material and the second fiber material. For example, if the two materials present their x- and y-refractive indices at the interface, and $n_{1x} \neq n_{1y}$, i.e. the first material is birefringent, then the interface is birefringent. Different exemplary embodiments of the polarizing fibers are discussed below.

The fibers 204 are disposed generally parallel to an axis, illustrated as the x-axis in the figure. The refractive index difference at the birefringent interfaces within the fibers 204 for light polarized parallel to the x-axis, $n_{1x}-n_{2x}$, may be different from the refractive index difference for light polarized parallel to the y-axis, $n_{1y}-n_{2y}$. The interface is said to be birefringent when the difference in refractive index at the interface is different for different directions. Thus, for a birefringent interface, $\Delta n_x \neq \Delta n_y$, where $\Delta n_x = |n_{1x}-n_{2x}|$ and $\Delta n_y = |n_{1y}-n_{2y}|$.

For one polarization state, the refractive index difference at the birefringent interfaces in the fibers 204 may be relatively small. In some exemplary cases, the refractive index difference may be less than 0.05. This condition is considered to be substantially index-matched. This refractive index difference may be less than 0.03, less than 0.02, or less than 0.01. If this polarization direction is parallel to the x-axis, then x-polarized light passes through the body 200 with little or no reflection. In other words, x-polarized light is highly transmitted through the body 200.

The refractive index difference at the birefringent interfaces in the fibers may be relatively high for light in the orthogonal polarization state. In some exemplary examples, the refractive index difference may be at least 0.05, and may be greater, for example 0.1, or 0.15 or may be 0.2. If this polarization direction is parallel to the y-axis, then y-polarized light is reflected at the birefringent interfaces. Thus, y-polarized light is reflected by the body 200. If the birefringent interfaces within the fibers 204 are substantially parallel to each other, then the reflection may be essentially specular. If, on the other hand, the birefringent interfaces within the fibers 204 are not substantially parallel to each other, then the reflection may be substantially diffuse. Some of the birefringent interfaces may be parallel, and other interfaces may be non-parallel, which may lead to the reflected light containing both specular and diffuse components. Also, a birefringent interface may be curved, or relatively small, in other words within an order of magnitude of the wavelength of the incident light, which may lead to diffuse scattering.

While the exemplary embodiment just described is directed to index matching in the x-direction, with a relatively large index difference in the y-direction, other exemplary embodiments include index matching in the y-direction, with a relatively large index difference in the x-direction.

The polymer matrix 202 may be substantially optically isotropic, for example having a birefringence, $n_{3x}-n_{3y}$, of less than about 0.05, and preferably less than 0.01, where the refractive indices in the matrix for the x- and y-directions are $n_{3x}$ and $n_{3y}$ respectively. In other embodiments, the polymer matrix 202 may be birefringent. Consequently, in some embodiments, the refractive index difference between the polymer matrix and the fiber materials may be different in different directions. For example, the x-refractive index difference, $n_{1x}-n_{3x}$, may be different from the y-refractive index difference, $n_{1y}-n_{3y}$. In some embodiments, one of these refractive index differences may be at least twice as large as the other refractive index difference.

In some embodiments, the refractive index difference, the extent and shape of the birefringent interfaces, and the relative positions of the birefringent interfaces may result in diffuse scattering of one of the incident polarizations more than the other polarization. Such scattering may be primarily back-scattering (diffuse reflection) forward-scattering (diffuse transmission) or a combination of both back- and forward-scattering.

Suitable materials for use in the polymer matrix and/or in the fibers include thermoplastic and thermosetting polymers that are transparent over the desired range of light wavelengths. In some embodiments, it may be particularly useful that the polymers be non-soluble in water. Further, suitable polymer materials may be amorphous or semi-crystalline, and may include homopolymer, copolymer or blends thereof. Example polymer materials include, but are not limited to, poly(carbonate) (PC); syndiotactic and isotactic poly(styrene) (PS); C1-C8 alkyl styrenes; alkyl, aromatic, and aliphatic ring-containing (meth)acrylates, including poly(methylmethacrylate) (PMMA) and PMMA copolymers; ethoxylated and propoxylated (meth)acrylates; multifunctional (meth)acrylates; acrylated epoxies; epoxies; and other ethylenically unsaturated materials; cyclic olefins and cyclic olefinic copolymers; acrylonitrile butadiene styrene (ABS); styrene acrylonitrile copolymers (SAN); epoxies; poly(vinylcyclohexane); PMMA/poly(vinylfluoride) blends; poly(phenylene oxide) alloys; styrenic block copolymers; polyimide; polysulfone; poly(vinyl chloride); poly(dimethyl siloxane) (PDMS); polyurethanes; unsaturated polyesters; poly(ethylene), including low birefringence polyethylene; poly(propylene) (PP); poly(alkane terephthalates), such as poly(ethylene terephthalate) (PET); poly(alkane napthalates), such as poly(ethylene naphthalate) (PEN); polyamide; ionomers; vinyl acetate/polyethylene copolymers; cellulose acetate; cellulose acetate butyrate; fluoropolymers; poly(styrene)-poly(ethylene) copolymers; PET and PEN copolymers, including polyolefinic PET and PEN; and poly(carbonate)/aliphatic PET blends. The term (meth)acrylate is defined as being either the corresponding methacrylate or acrylate compounds. With the exception of syndiotactic PS, these polymers may be used in an optically isotropic form.

Several of these polymers may become birefringent when oriented. In particular, PET, PEN, and copolymers thereof, and liquid crystal polymers, manifest relatively large values of birefringence when oriented. Polymers may be oriented using different methods, including extrusion and stretching. Stretching is a particularly useful method for orienting a polymer, because it permits a high degree of orientation and may be controlled by a number of easily controllable external parameters, such as temperature and stretch ratio. The refractive indices for a number of exemplary polymers, oriented and unoriented, are provided in Table I below.

TABLE I

Typical Refractive Index Values for Some Polymer Materials

| Resin/Blend | S.R. | T (° C.) | $n_x$ | $n_y$ | $n_z$ |
|---|---|---|---|---|---|
| PEN | 1 | — | 1.64 | | |
| PEN | 6 | 150 | 1.88 | 1.57 | 1.57 |
| PET | 1 | — | 1.57 | | |
| PET | 6 | 100 | 1.69 | 1.54 | 1.54 |
| CoPEN | 1 | — | 1.57 | | |
| CoPEN | 6 | 135 | 1.82 | 1.56 | 1.56 |
| PMMA | 1 | — | 1.49 | | |
| PC, CoPET blend | 1 | — | 1.56 | | |
| THV | 1 | — | 1.34 | | |
| PETG | 1 | — | 1.56 | | |
| SAN | 1 | — | 1.56 | | |
| PCTG | 1 | — | 1.55 | | |
| PS, PMMA copolymer | 1 | — | 1.55-1.58 | | |
| PP | 1 | — | 1.52 | | |
| Syndiotactic PS | 6 | 130 | 1.57 | 1.61 | 1.61 |

PCTG and PETG (a glycol-modified polyethylene terephthalate) are types of copolyesters available from, for example, Eastman Chemical Co., Kingsport, Tenn., under the Eastar™ brand name. THV is a polymer of tetrafluoroethylene, hexafluoropropylene and vinylidene fluoride, available from 3M Company, St. Paul, Minn., under the brand name Dyneon™. The PS/PMMA copolymer is an example of a copolymer whose refractive index may be "tuned" by changing the ratio of the constituent monomers in the copolymer to achieve a desired value of refractive index. The column labeled "S.R." contains the stretch ratio. A stretch ratio of 1 means that the material is unstretched and unoriented. A stretch ratio of 6 means that sample was stretched to six times it original length. If stretched under the correct temperature conditions, the polymeric molecules are oriented and the material becomes birefringent. It is possible, however, to stretch the material without orienting the molecules. The column labeled "T" indicates the temperature at which the sample was stretched. The stretched samples were stretched as sheets. The columns labeled $n_x$, $n_y$ and $n_z$ refer to the refractive indices of the material. Where no value is listed in the table for $n_y$ and $n_z$, the values of $n_y$ and $n_z$ are the same as for $n_x$.

The behavior of the refractive index under stretching a fiber is expected to give results similar to, but not necessarily the same as, those for stretching a sheet. Polymer fibers may be stretched to any desired value that produces desired values of refractive index. For example, some polymer fibers may be stretched to produce a stretch ratio of at least 3, and maybe at least 6. In some embodiments, polymer fibers may be stretched even more, for example to a stretch ratio of up to 20, or even more.

A suitable temperature for stretching to achieve birefringence is approximately 80% of the polymer melting point, expressed in Kelvins. Birefringence may also be induced by stresses induced by flow of the polymer melt experienced during extrusion and film formation processes. Birefringence may also be developed by alignment with adjacent surfaces such as fibers in the film article. Birefringence may either be positive or negative. Positive birefringence is defined as when the direction of the electric field axis for linearly polarized light experiences the highest refractive index when it is parallel to the polymer's orientation or aligning surface. Negative birefringence is defined as when the direction of the electric field axis for linearly polarized light experiences the lowest refractive index when it is parallel to the polymer's orientation or aligning surface. Examples of positively birefringent polymers include PEN and PET. An example of a negatively birefringent polymer includes syndiotactic polystyrene.

The matrix 202 and/or the polymer fibers 204 may be provided with various additives to provide desired properties to the body 200. For example, the additives may include one or more of the following: an anti-weathering agent, UV absorbers, a hindered amine light stabilizer, an antioxidant, a dispersant, a lubricant, an anti-static agent, a pigment or dye, a nucleating agent, a flame retardant and a blowing agent. Other additives may be provided for altering the refractive index of the polymer or increasing the strength of the material. Such additives may include, for example, organic additives such as polymeric beads or particles and polymeric nanoparticles, or inorganic additives, such as glass, ceramic or metal-oxide nanoparticles, or milled, powered, bead, flake or particulate glass, ceramic or glass-ceramic. The surface of these additives may be provided with a binding agent for binding to the polymer. For example, a silane coupling agent may be used with a glass additive to bind the glass additive to the polymer.

In some embodiments, it may be preferable that the matrix 202 or a component of the fibers 204 be non-soluble, or at least resistant to solvents. Examples of suitable materials that are solvent resistant include polypropylene, PET and PEN. In other embodiments it may be preferable that the matrix 202 or component of the polymer fibers 204 is soluble in an organic solvent. For example, a matrix 202 or fiber component formed of polystyrene is soluble in an organic solvent such as acetone. In other embodiments, it may be preferable that the matrix is water soluble. For example, a matrix 202 or fiber component formed of polyvinyl acetate is soluble in water.

The refractive index of the materials in some embodiments of optical element may vary along the length of the fiber, in the x-direction. For example, the element may not be subject to uniform stretching, but may be stretched to a greater degree in some regions than in others. Consequently, the degree of orientation of the orientable materials is not uniform along the element, and so the birefringence may vary spatially along the element.

Furthermore, the incorporation of fibers within the matrix may improve the mechanical properties of the optical element. In particular, some polymeric materials, such as polyester, are stronger in the form of a fiber than in the form of a film, and so an optical element containing fibers may be stronger than one of similar dimensions that contains no fibers. The fibers 204 may be straight, but need not be straight, for example the fibers 204 may be kinked, spiraled or crimped.

In some embodiments, some or all of the fibers present in the polarizer layer may be polymeric polarizing fibers. In other embodiments, the polarizer may also contain fibers may formed of an isotropic material, such as an isotropic polymer or an inorganic material, such as glass, ceramic or glass-ceramic. Thus use of inorganic fibers in a film is discussed more detail in U.S. patent application Ser. No. 11/125,580, filed on May 10, 2005 and incorporated herein by reference. Inorganic fibers provide additional stiffness to a polarizer layer, and resistance to curling and shape changes under differential conditions of humidity and/or temperature.

In some embodiments, the inorganic fiber material has a refractive index that matches the refractive index of the matrix, and in other embodiments the inorganic fiber has a refractive index that is different from the refractive index of the matrix. Any transparent type of glass may be used, including high quality glasses such as E-glass, S-glass, BK7, SK10 and the like. Some ceramics also have crystal sizes that are sufficiently small that they can appear transparent if they are embedded in a matrix polymer with an index of refraction appropriately matched. The Nextel™ Ceramic fibers, available from 3M Company, St. Paul, Minn., are examples of this type of material, and are already available as thread, yarn and woven mats. Glass-ceramics of interest have compositions including, but not limited to, $Li_2O$—$Al_2O_3$—$SiO_2$, $CaO$—$Al_2O_3$—$SiO_2$, $Li_2O$—$MgO$—$ZnO$—$Al_2O_3$—$SiO_2$, $Al_2O_3$—$SiO_2$, and $ZnO$—$Al_2O_3$—$ZrO_2$—$SiO_2$, $Li_2O$—$Al_2O_3$—$SiO_2$, and $MgO$—$Al_2O_3$—$SiO_2$.

The polarizer layer may include polarizing fibers that are arranged within the matrix in many different ways. For example, the fibers may be positioned randomly across the cross-sectional area of the matrix. Other, more regular, cross-sectional arrangements may be also used. For example, in the exemplary embodiment schematically illustrated in FIG. 2, the fibers 204 are arranged in a one-dimensional array within the matrix 202, with regular spacing between adjacent fibers 204. In some variations of this embodiment, the spacing between adjacent fibers 204 need not be the same for all fibers 204. In the illustrated embodiment, the single layer of fibers 204 is positioned midway between the two faces 206, 208 of the element 200. This need not be the case, and the layer of fibers 204 may be positioned closer to either of the faces 206, 208.

Figure 3B:
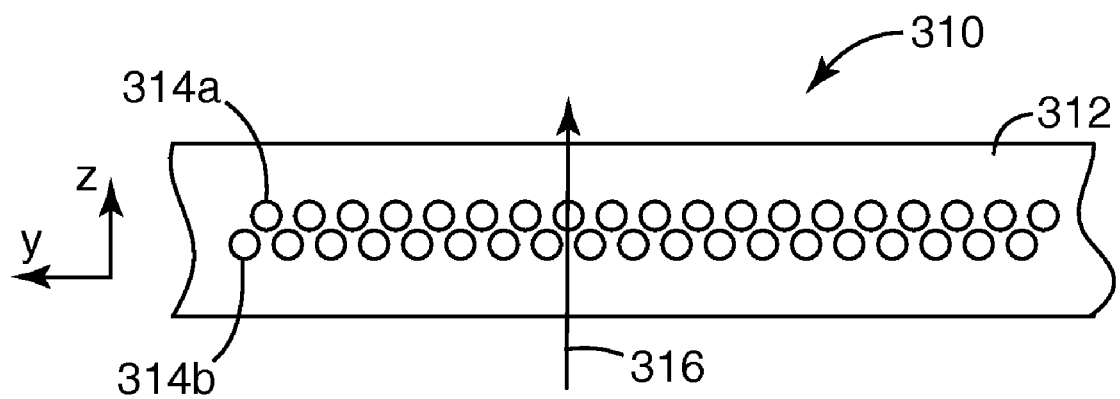

In another exemplary embodiment, schematically illustrated in cross-section in FIG. 3A, a polarizer film 300 includes two layers of fibers 304a, 304b positioned within a matrix 302. In this embodiment, the fibers 304a in the upper layer are spaced apart from each other with the same center-to-center spacing as the fibers 304b in the lower layer. Also, the fibers 304a in the upper layer are positioned in registration (aligned in the y-direction) with the fibers 304b of the lower layer. This need not be the case and the center-to-center spacing may be different and/or the y-alignment may be different. For example, in the embodiment of polarizer 310 schematically illustrated in FIG. 3B, the center-to-center spacing between fibers 314a in the upper layer is the same as for the fibers 314b of the lower layer. However, fibers 304a are offset in the y-direction from fibers 304b. One possible advantage of this embodiment is that the upper layer of fibers 314a can "fill in" the spaces between the fibers 314b in the lower layer, and so the chances of a normally propagating light ray 316 of intersecting a fiber 304a or 304b, and thus becoming polarized, are increased.

Figure 3C:
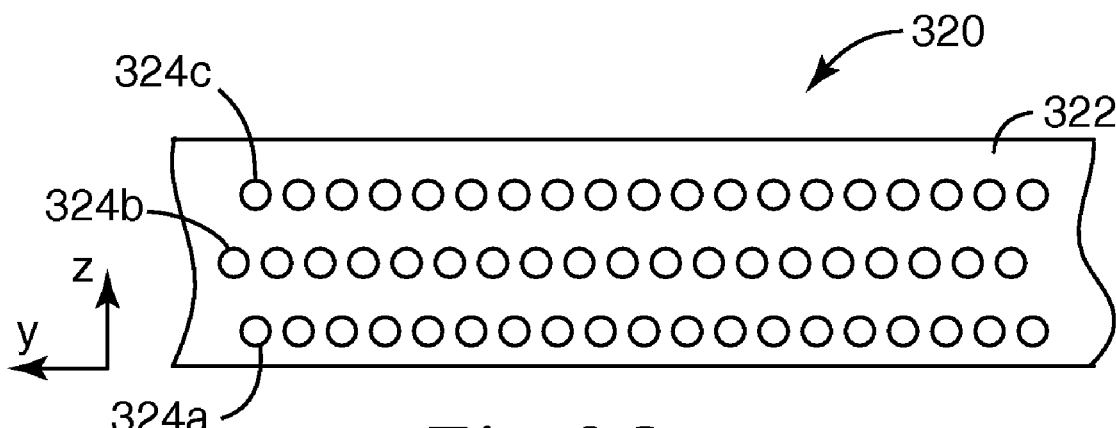

Additional layers of fibers may be used. For example, in the embodiment of polarizer film 320 schematically illustrated in FIG. 3C, the matrix 322 contains three layers of fibers 324a, 324b and 324c. In this particular embodiment, the middle layer of fibers 324b is offset in the y-direction from the upper and lower layers of fibers 324a, 324c. Also, this embodiment shows that the spacing between fibers in the y-direction may be different from the spacing between fibers in the z-direction.

The polarizing fibers may be organized within the matrix as single fibers or in many other arrangements. In some exemplary arrangements, the fibers may be included in the polarizer in the form of a yarn, a tow (of fibers or yarns) arranged in one direction within the polymer matrix, a weave, a nonwoven, chopped fiber, a chopped fiber mat (with random or ordered formats), or combinations of these formats. The chopped fiber mat or nonwoven may be stretched, stressed, or oriented to provide some alignment of the fibers within the nonwoven or chopped fiber mat, rather than having a random arrangement of fibers. The formation of a polarizer having an arrangement of polarizing fibers within a matrix is described more fully in U.S. patent application Ser. No. 11/068,157, filed on Feb. 28, 2005 and incorporated herein by reference.

Figure 4:
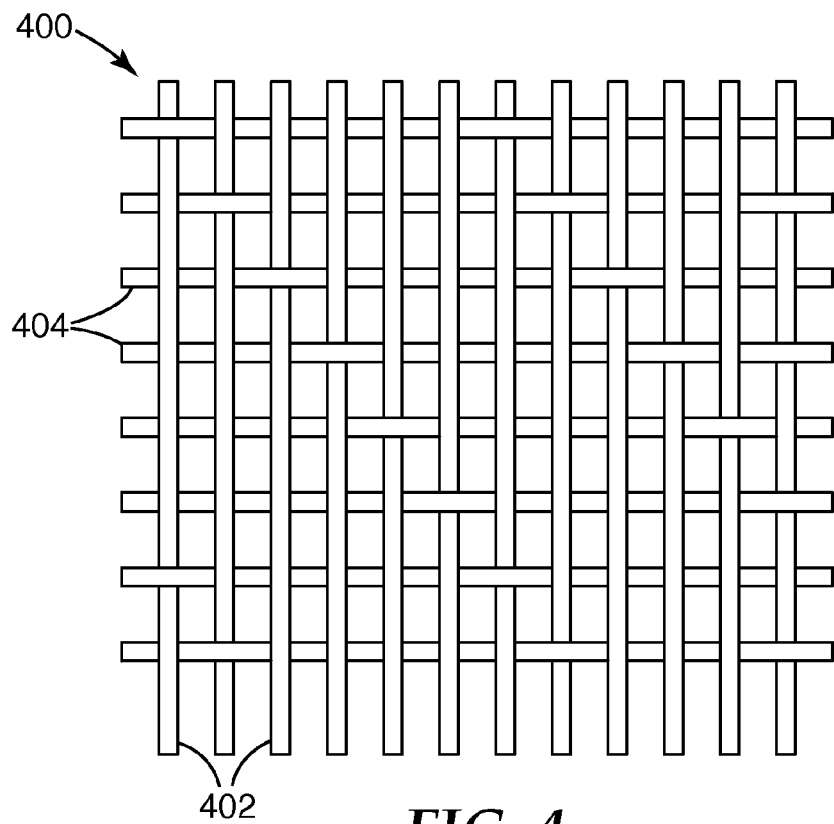
FIG. 4 schematically illustrates a fiber weave as might be used in some embodiments of the present invention.

The fibers may be included in the matrix in the form of one or more fiber weaves. A weave 400 is schematically illustrated in FIG. 4. Polarizing fibers may form part of the warp 402 and/or part of the weft 404. Inorganic fibers may be included in the weave and may also form part of the warp 402 and/or the weft 404. Additionally, some of the fibers of the warp 402 or weft 404 may be isotropic polymer fibers. The embodiment of weave 400 shown in FIG. 4 is a five-harness satin weave, although different types of weaves may be used, for example other types of satin weaves, plain weaves and the like.

In some embodiments, more than one weave may be included within a matrix. For example, a polarizer film may include one or more weaves that contain polarizing fibers and one or more weaves that contain only inorganic fibers. In other embodiments, different weaves may include both polarizing fibers and inorganic fibers. The polarizer 320 having three layers of fibers may be formed, for example, with three woven layers of fibers.

The polarizer may also be provided with structures on one or both surfaces, for example as discussed in greater detail in U.S. patent application Ser. No. 11/068,157. Such surfaces may include, for example, a brightness enhancing surface, a lensed surface, a diffusing surface and the like. Also, the density of polarizing fibers and/or other fibers need not be uniform throughout the volume of the polarizer, but may vary. In illustration, some fibers may be used to provide diffusion, either in reflection or transmission, for example to reduce the nonuniformity of the illuminance across the polarizer. This may be done to hide a light source positioned behind the polarizer, with the density of fibers being greater above the light source and being reduced away from the light source.

In one exemplary embodiment the birefringent material used in a fiber is of a type that undergoes a change in refractive index upon orientation. Consequently, as the fiber is oriented, refractive index matches or mismatches may be produced along the direction of orientation and may also be produced along the non-oriented directions. By careful manipulation of orientation parameters and other processing conditions, the positive or negative birefringence of the birefringent material can be used to induce reflection or transmission of one or both polarizations of light along a given axis. The relative ratio between transmission and diffuse reflection is dependent on a number of factors such as, but not limited to, the concentration of the birefringent interfaces in the fiber, the dimension of the fiber, the square of the difference in the index of refraction at the birefringent interfaces, the size and geometry of the birefringent interfaces, and the wavelength or wavelength range of the incident radiation.

The magnitude of the index match or mismatch along a particular axis affects the degree of scattering of light polarized along that axis. In general, the scattering power varies as the square of the index mismatch. Thus, the larger the mismatch in refractive index along a particular axis, the stronger the scattering of light polarized along that axis. Conversely, when the mismatch along a particular axis is small, light polarized along that axis is scattered to a lesser extent and the transmission through the volume of the body becomes increasingly specular.

If the index of refraction of the non-birefringent material matches that of the birefringent material along some axis, then incident light polarized with electric fields parallel to this axis will pass through the fiber unscattered regardless of the size, shape, and density of the portions of birefringent material. In addition, if the refractive index along that axis is also substantially matched to that of the polymer matrix of the polarizer body, then the light passes through the body substantially unscattered. Substantial matching between two refractive indices occurs when the difference between the indices is less than at most 0.05, and preferably less than 0.03, 0.02 or 0.01.

The strength of the scattering, forward and backward, is determined, at least in part, by the magnitude of the index mismatch for scatterers having a given cross-sectional area with dimensions larger than approximately $\lambda/30$, where $\lambda$ is the wavelength of the incident light in the polarizer. The exact size, shape and alignment of a mismatched interface play a role in determining how much light is scattered or reflected into various directions from that interface.

Prior to use in the polarizer, the fibers may be processed by stretching and allowing some dimensional relaxation in the cross stretch in-plane direction, so that the index of refraction difference between the birefringent material and the non-birefringent materials are relatively large along a first axis and small along the other two orthogonal axes. This results in a large optical anisotropy for electromagnetic radiation of different polarizations.

The ratio of forward-scattering to back-scattering is dependent on the difference in refractive index between the birefringent and non-birefringent materials, the concentration of the birefringent interfaces, the size and shape of the birefringent interfaces, and the overall thickness of the fiber. In general, elliptical diffusers have a relatively small difference in index of refraction between the birefringent and non-birefringent materials.

The materials selected for use in the fibers in accordance with the present invention, and the degree of orientation of these materials, are preferably chosen so that the birefringent and non-birefringent materials in the finished fiber have at least one axis for which the associated indices of refraction are substantially equal. The match of refractive indices associated with that axis, which typically, but not necessarily, is an axis transverse to the direction of orientation, results in substantially no reflection of light in that plane of polarization.

One exemplary embodiment of a polarizing fiber that has internal birefringent interfaces and that is suitable for use in some embodiments of the present invention is a multilayer polarizing fiber. A multilayer fiber is a fiber that contains multiple layers of different polymer materials, at least one of which is birefringent. In some exemplary embodiments, the multilayer fiber contains a series of alternating layers of a first material and a second material, where at least one of the materials is birefringent. In some embodiments, the first material has a refractive index along one axis about the same as that of the second material and the refractive index along an orthogonal axis different from that of the second material. Layers of additional materials also be used in a multilayer fiber.

Figure 5A:
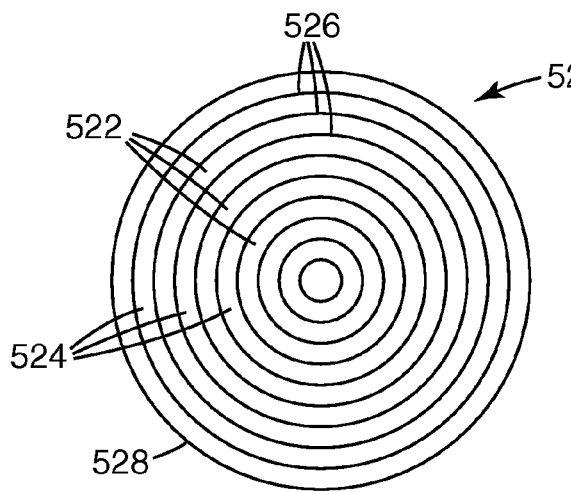
FIGS. 5A-5H schematically illustrate cross-sectional views through different embodiments of multilayer polarizing fiber according to principles of the present invention.

One type of multilayer fiber is referred to as a concentric multilayer fiber. In a concentric multilayer fiber, the layers may be formed completely surrounding the center core of the fiber. A cross-section through one exemplary embodiment of a concentric multilayer polarizing fiber 500 is schematically illustrated in cross-section in FIG. 5A. The fiber 500 contains alternating layers of a first material 502 and a second material 504. The first material is birefringent and the second material may be either birefringent or isotropic, so that the interfaces 506 between adjacent layers are birefringent.

The fiber 500 may be surrounded by a cladding layer 508. The cladding layer 508 may be made of the first material, the second material, the material of the polymer matrix in which the fibers are embedded, or some other material. The cladding may functionally contribute to the performance of the overall device, or the cladding may perform no function. The cladding may functionally improve the optics of the reflective polarizer, such as by minimizing the depolarization of light at the interface of the fiber and the matrix. Optionally, the cladding may mechanically enhance the polarizer, such as by providing the desired level of adhesion between the fiber and the continuous phase material. In some embodiments, the cladding 508 may be used to provide an antireflection function, for example by providing some refractive index matching between the fiber 500 and the surrounding polymer matrix.

The fiber 500 may be formed with different numbers of layers and with different sizes, depending on the desired optical characteristics of the fiber 500. For example, the fiber 500 may be formed with from about ten layers to hundreds of layers, with an associated range in thickness. Values of the fiber width may fall in a range from 5 µm to about 5000 µm, although the fiber width may also fall outside this range. In some embodiments, the layers 502, 504 may have a thickness that is a quarter-wave thickness for a particular wavelength, or wavelength range, although this is not a necessary condition for the invention. An arrangement of quarter-wavelength layers provides for coherent scattering and/or reflection, and so a large reflection/scattering effect can be obtained with fewer layers than the case where scattering/reflection is incoherent. This increases the efficiency of the polarizer and reduces the amount of materials needed to obtain a desired level of polarization. A layer is said to have a quarter-wavelength thickness when the thickness, t, is equal to one quarter of the wavelength divided by the refractive index, so $t=\lambda/(4n)$, where n is the refractive index and $\lambda$ is the wavelength.

A concentric multilayer fiber 500 may be fabricated by coextruding multiple layers of material into a multilayer fiber, followed by a subsequent step of stretching so as to orient the birefringent material and produce birefringent interfaces. Some examples of suitable polymer materials that may be used as the birefringent material include PET, PEN and various copolymers thereof, as discussed above. Some examples of suitable polymer materials that may be used as the non-birefringent material include the optically isotropic materials discussed above. Generally, it is found that multilayer fibers are fabricated more easily when the polymer materials used in the fiber wet to each other and have compatible processing temperatures.

Multilayer fibers having different types of cross-sections may also be used. For example, concentric fibers need not be circular in shape and may have some other shape, such as elliptical, rectangular or the like. For example, another exemplary embodiment of multilayer fiber 510, schematically illustrated in cross-section in FIG. 5B, may be formed with concentric layers of alternating first material 512 and second material 514, where the first material 512 is birefringent and the second material 514 may be either isotropic or birefringent. In this exemplary embodiment, the fiber 510 includes concentric birefringent interfaces 516, between the alternating layers 512, 514, that extend along the length of the fiber 520. In this embodiment, the fiber 510 is non-circularly symmetric and is elongated along one direction. Using the coordinate system of the figure, the fiber cross-section is elongated in the y-direction and, therefore, the dimension, $d_y$, in the y-direction is larger than the dimension, $d_z$, in the z-direction.

Figure 5B:
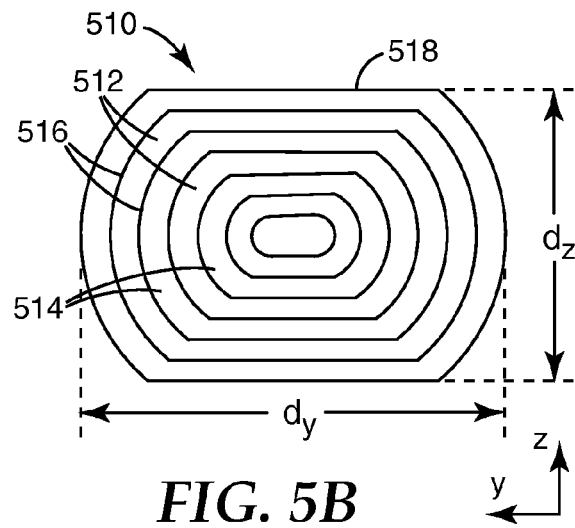
Figure 5C:
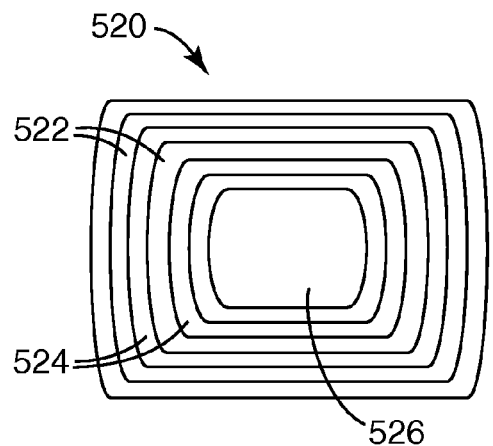

In some embodiments of concentric multilayer fiber, the multiple layers may be provided around a central fiber core. This is schematically illustrated in FIG. 5C, which shows a fiber 520 having alternating material layers 522, 524 around a core 526. The core 526 may be formed of the same material as either of the layers 522, 524, or may be formed of a different material. For example, the core 526 may be formed of a different polymer material or of an inorganic material such as a glass.

Figure 5D:
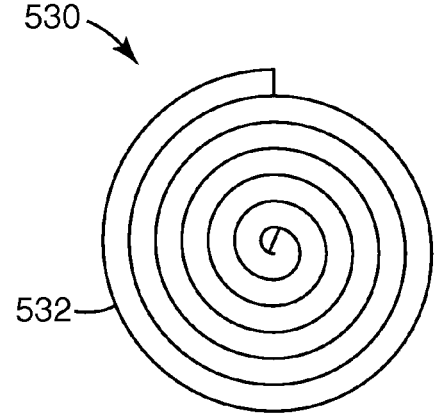

Another exemplary embodiment of a multilayer polarizing fiber is a spiral wound fiber, described in greater detail in U.S. patent application Ser. No. 11/278,348, filed on Mar. 31, 2006 and incorporated herein by reference. An exemplary embodiment of a spiral wound fiber is schematically illustrated in FIG. 5D. In this embodiment, the fiber 530 is formed like a two-layer sheet 532 that is wound around itself to form a spiral. The two layer sheet contains a layer of a first polymer material that is birefringent and a second layer of a second material that may be isotropic or birefringent. The birefringent polymer material(s) may be oriented before or after the fiber is formed. The interfaces 534 between adjacent layers are interfaces between a birefringent material and another material, and so are considered birefringent interfaces. A spiral wound fiber is considered here to be a concentric multilayer fiber. A spiral wound fiber may be manufactured in several different ways. For example a spiral wound fiber may be formed by extrusion or by rolling a sheet containing two or more layers. These methods are discussed in greater detail in U.S. patent application Ser. No. 11/278,348.

Figure 5E:
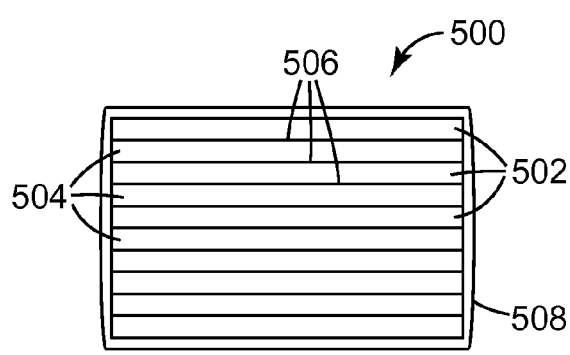

Another type of multilayer fiber is a stacked multilayer fiber, in which the layers are formed in a stack. A cross-section of one exemplary embodiment of a stacked multilayer fiber 540 is schematically illustrated in FIG. 5E. In this embodiment layers 542 of the first polymer material are disposed between layers 544 of the second polymer material. The fiber 540 may include an optional cover layer 546. In this embodiment, the layers 542, 544 are planar. The fibers layers 542, 544 need not be planar and may take on some other shape.

Figure 5F:
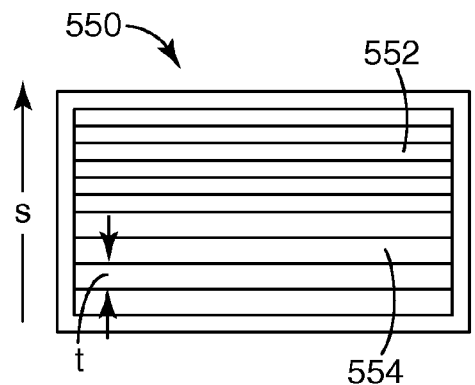

In some embodiments, the layers in a multilayer fiber may all have the same thickness. In other embodiments, the layers in multilayer fiber are not all of the same thickness. For example, it may be desired that a polarizer is effective at polarizing light over the entire visible wavelength range, approximately 400 nm-700 nm. Therefore, a polarizer may be provided with different fibers, where each fiber has layers of a uniform thickness, but where some fibers have layers thicker than others, so that different fibers are more effective at polarizing some wavelengths rather than others. Another approach to providing wide bandwidth effectiveness is to provide a fiber having layers whose thicknesses vary over a range. For example, a multilayer fiber may be provided with many layers, where the layer thickness changes with position within the fiber. One exemplary embodiment of such a fiber 550 is schematically illustrated in cross-section in FIG. 5F. In this embodiment, the layer thickness, t, decreases with distance, s, from the bottom of the fiber. Thus, layer 552, which is further from the bottom side of the fiber 550 than layer 554, is thinner than layer 554.

Figure 5G:
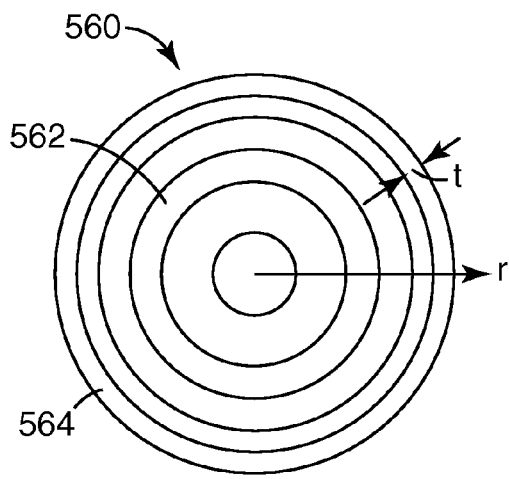

Another exemplary embodiment of a fiber 560 having layers of different thicknesses is schematically illustrated in cross-section in FIG. 5G. In this embodiment, a layer 562 closer to the center of the fiber 560 has a thickness, t, that is greater than the thickness of a layer 544 that is further from the center. In other words, in this particular embodiment, the layer thickness, t, decreases with the radius, r of the layer.

Figure 5H:
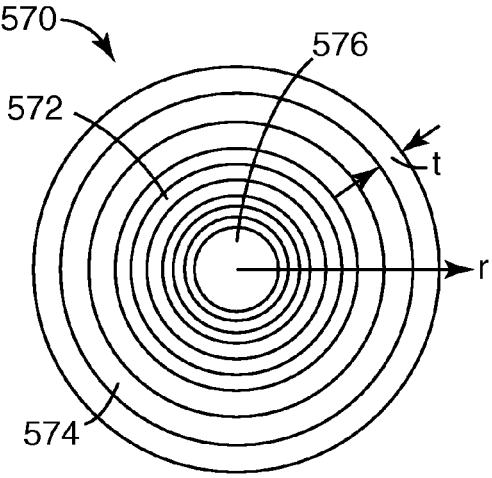

A cross-section of another embodiment of multilayer fiber 570 is schematically illustrated in FIG. 5H. In this embodiment, a layer 572 closer to the core 576 of the fiber 570 has a thickness, t, that is less than the thickness of a layer 574 that is further from the center of the fiber 570. In other words, in this particular embodiment, the layer thickness, t, increases with the radius, r, of the layer.

The layer thickness of a fiber may vary in different ways. For example, the layer thickness may increase or decrease gradually from the inside of the fiber to the outside, with a steady gradient. In other embodiments, the fiber may be provided with groups of layers, for example where layers in a first group have a first thickness, the layers in a second group have a second thickness different from the first thickness, and so on. A number of different layer thickness profiles are now described with reference to FIGS. 6A-6H. These figures show exemplary layer thickness profiles as a function of optical thickness, ot, as a function of the distance, d, from a fiber origin. A fiber origin is a location from which distances to layers are is measured. In the case of a stacked multilayer film, the origin is taken as one side of the stack, so that the distance, d, is simply the distance through the stack. In the case of a concentric fiber, the origin is taken as the center of the fiber. When the concentric fiber is circular in cross-section, the distance, d, is equal to the radius. The optical thickness, which is the product of the physical thickness and the refractive index of the layer, is useful in describing some of these different embodiments, since a multilayer fiber may be provided with quarter-wavelength layers for maximizing the reflection efficiency for one polarization state. Accordingly, the optical thickness of the layer is a useful parameter in understanding the reflection characteristics of the fiber. The layer thickness profiles shown here may represent the layer profile of the entire fiber, or part of the fiber.

Figure 6A:
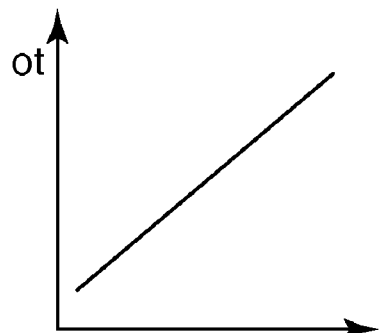
FIGS. 6 and 7 schematically illustrate cross-sectional views of an embodiment of a polarizer, showing the interaction of incident light with a multilayer polarizing fiber.
Figure 6B:
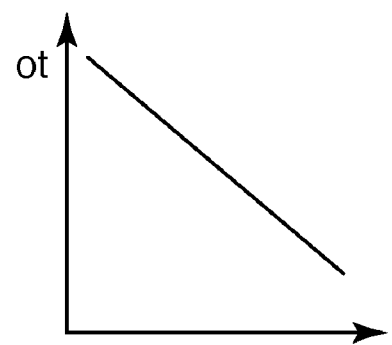
Figure 6C:
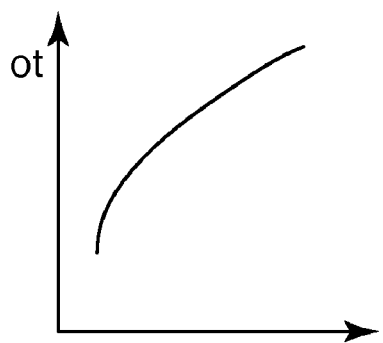
Figure 6D:
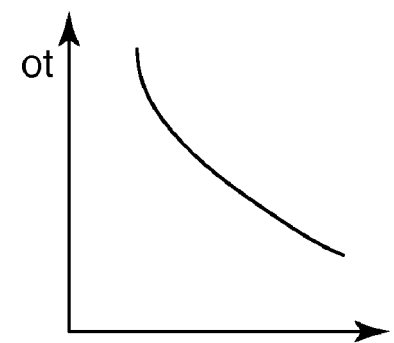

In FIGS. 6A and 6B, the optical thickness of the layers respectively increase and decrease linearly with distance from the fiber origin. In FIGS. 6C and 6D, the optical thickness of the layers respectively increase and decrease nonlinearly with distance from the fiber origin. The shape of the nonlinearity may be different from those shown, depending on the desired design parameters for the fiber.

Figure 6E:
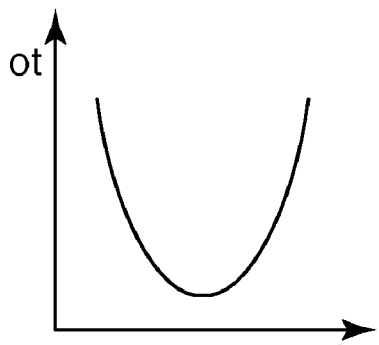

In FIG. 6E, the optical thickness of the layers comes to a minimum somewhere in the middle region between the origin of the fiber and the fiber edge. Thus, in this embodiment, a layer of, for example the first polymer material, associated with a first distance from the fiber origin i) has a smaller optical thickness than the optical thickness of a second layer of the first polymer material having a second distance from the fiber origin smaller than the first distance and ii) has a smaller optical thickness than the optical thickness of a third layer of the first polymer material having a third distance from the fiber origin greater than the first distance.

Figure 6F:
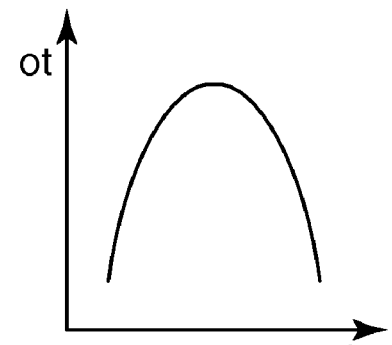

In FIG. 6F, the optical thickness of the layers comes to a maximum somewhere in the middle region between the origin of the fiber and the fiber edge. Thus, in this embodiment, a layer of the first polymer material associated with a first distance from the fiber origin i) has a greater optical thickness than the optical thickness of a second layer of the first polymer material having a second distance from the fiber origin smaller than the first distance and ii) has a greater optical thickness than the optical thickness of a third layer of the first polymer material having a third distance from the fiber origin greater than the first distance.

Figure 6G:
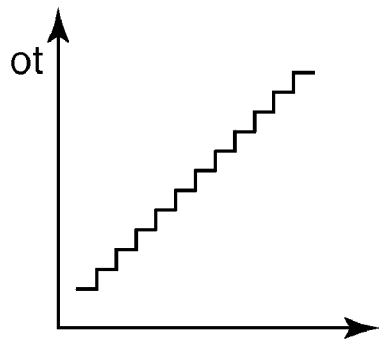
Figure 6H:
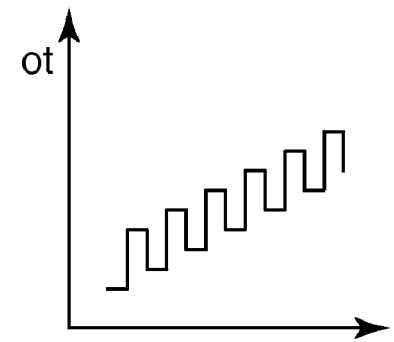

In some embodiments, the layers may be formed in packets, where a number of layers of the same optical thickness are grouped together. Different packets may be associated with different optical thicknesses. An example of a fiber having a number of layer packets is shown in the profile of FIG. 6G, where the packets are associated with layers of an increasing optical thickness as the packet position moves outwards from the origin of the fiber. Another example is shown in FIG. 6H, in which, for packets increasing separated from the fiber origin, the packets alternately are associated with layers of greater and smaller optical thickness. The different layer thickness profiles described here are representative and are not considered to be exhaustive. Many other different layer thickness profiles are possible.

Figure 7A:
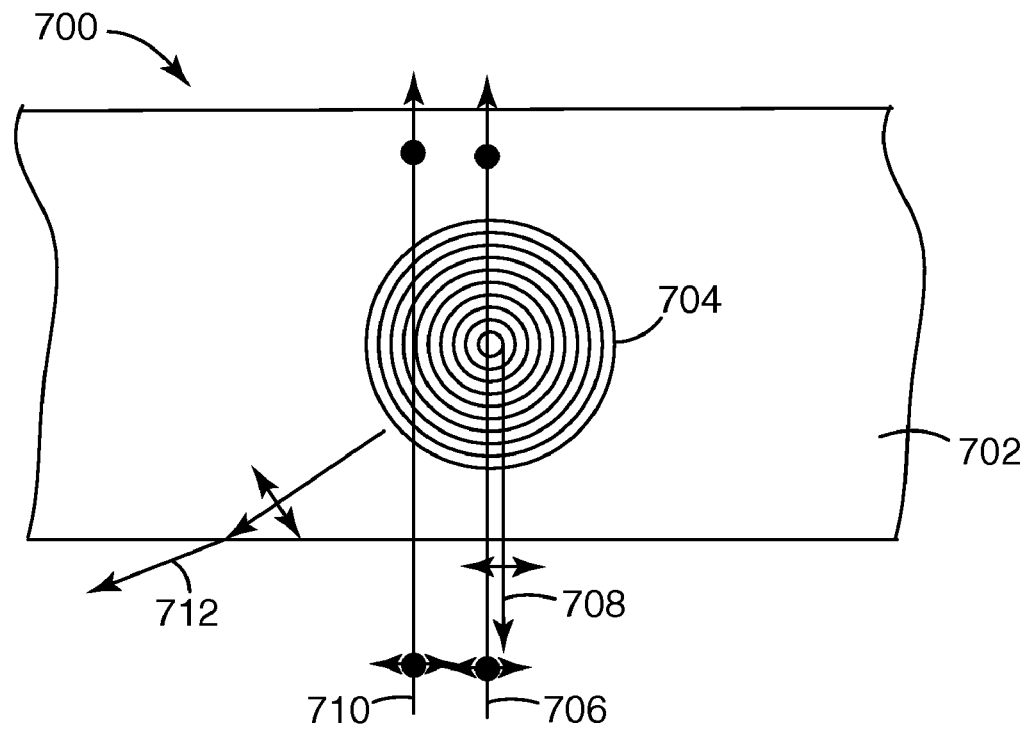

The incidence of light at the edges of a multilayer polarizing fiber is now discussed with reference to FIG. 7A, which schematically illustrates a single concentric multilayer polarizing fiber 704 embedded in the matrix 702 of a polarizer film 700. The present discussion only considers light that is normally incident at the polarizer 700. It will be appreciated that the concepts discussed here may be extended to light incident at the polarizer at other angles. Light ray 706 is directed at the center of the fiber 704 so as to be normally incident at the layers of fiber 704. Thus, light 708 in one polarization state is reflected from the fiber 704 with a first reflection spectrum, with the remainder of the light in that polarization state being transmitted. However, light ray 710, incident at the fiber 704 with a non-normal angle of incidence to the layers of the fiber 704, results in light 712 reflected from the fiber 704 with a spectrum different from the first reflection spectrum for reflected light 708. The reflection spectrum of a multilayer structure typically shifts to the blue as the angle of incidence on the multilayer structure is increased. Thus, the spectrum of light 712 reflected is blue shifted relative to the spectrum of reflected light 708. This may lead to nonuniformities in the spectrum of light transmitted and reflected by the polarizer. For example, where a multilayer fiber has layers for reflection over the visible region, 400 nm-700 nm, for normally incident light, red light incident at high angles may be affected to a lesser degree than blue light due to the blue shift of the reflection spectrum.

Various approaches may be used to reduce the effect of the blue shift. For example, in one approach, the multilayer fiber may be provided with layers that are quarter-wave layers for light having a longer wavelength than the range of light that is incident on the polarizer. Where the polarizer is being used in a display system, the wavelength range of light of interest is typically around 400 nm-700 nm. Thus, a multilayer fiber 704 may be provided with layers that are quarter-wavelength layers for a wavelength longer than 700 nm, at a wavelength in the near infrared range, for example up to 900 nm or beyond. If the light is incident at an angle that shifts the spectrum by, for example, less than 200 nm, then the fiber may still be effective at polarizing red light even at high angles of incidence.

Figure 7B:
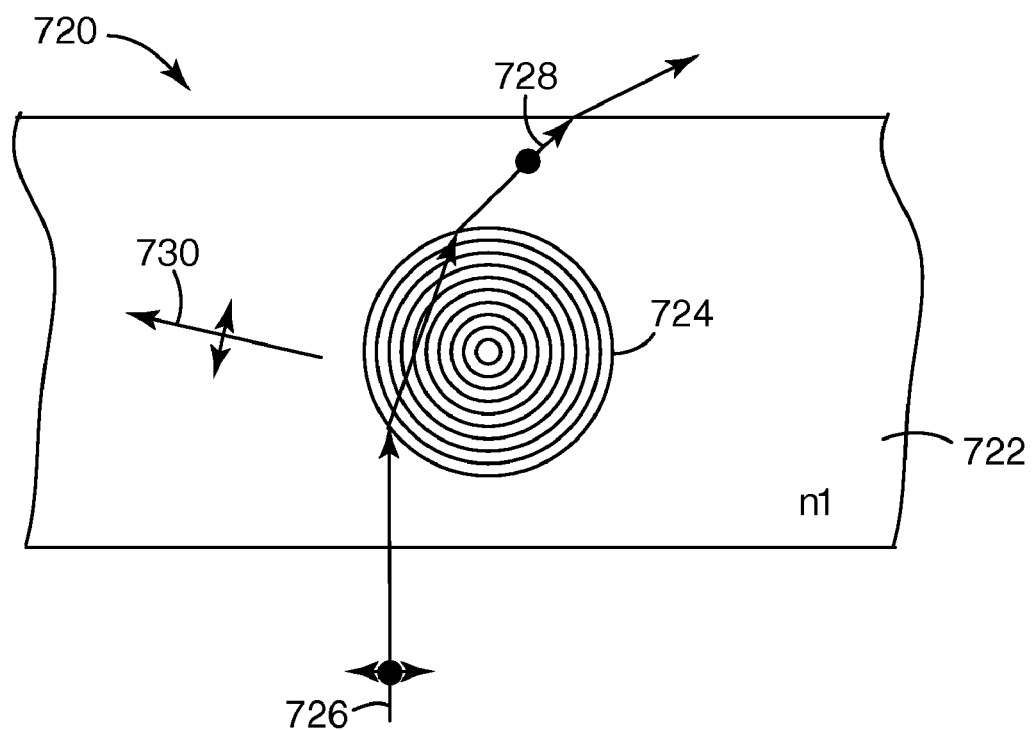

Another approach to reducing the effect of the blue shift is to reduce the angle of incidence on the fiber. This may be achieved, for example, by reducing the refractive index, n1, of the matrix 722, to a value less than the refractive index of the materials of the different fiber layers 724, as schematically illustrated for polarizer 720 in FIG. 7B. On passing from the relatively low refractive index material of the matrix 722 into the relatively higher refractive index material of the fiber 724, the incident light 726 is refracted towards a normal to the fiber layers, and so the angle at which the light propagates within the fiber's multilayer structure is reduced. Light ray 728 shows the direction of light transmitted through the fiber 724, and light ray 730 shows the light reflected by the fiber 724. Examples of low refractive index polymers that may be used for the matrix 722 include PMMA (ref. index around 1.49); THV, a fluorinated polymer available from 3M Company, St. Paul, Minn. having a ref. index of around 1.34; low molecular weight difunctional urethane acrylates, typically having a refractive index in the range of about 1.47-1.5; and some silicones which can have a refractive index of around 1.41.

Figure 8:
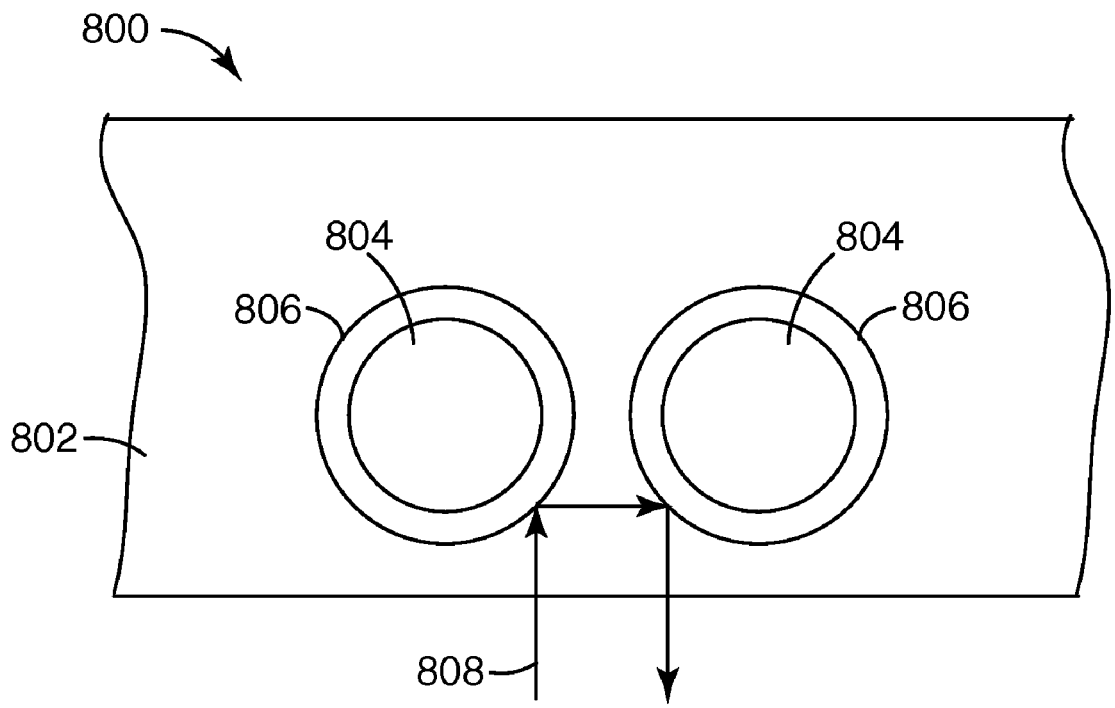
FIG. 8 schematically illustrates a cross-sectional view of a polarizer having low index coatings surrounding multilayer polarizing fibers, according to principles of the present invention.

Another approach to reducing the effect of the blue shift is to provide the fiber with a low refractive index coating. This approach is schematically illustrated in FIG. 8, which shows a polarizer 800 with multilayer fibers 804 embedded within a matrix 802. Each fiber 804 is provided with a coating 806 having a relatively low refractive index, lower than the refractive index of the matrix 802 and the materials used in the fiber 804. The coating 806 may be formed from one of the low refractive index materials listed in the previous paragraph. In this embodiment, light 808 is incident on the polarizer 800 in such a direction as to propagate towards an edge region of the fiber 804. Without the low index coating 806, the light 808 would intersect the fiber 804 close to an edge, at an angle of incidence that is non-normal. However, the light 808 is incident at the interface between the low index coating 806 and the matrix 802. Where i) the difference in refractive index between the matrix 802 and coating 806, and ii) the angle of incidence are sufficiently large, the light 808 may be totally internally reflected. In the illustrated embodiment, the totally internally reflected light is directed towards an adjacent fiber 804, where the light is totally internally reflected for a second time. Depending on the angle of total internal reflection and the positions of other fibers, the totally internally reflected light may be reflected at other fibers or transmitted through other fibers.

Figure 9:
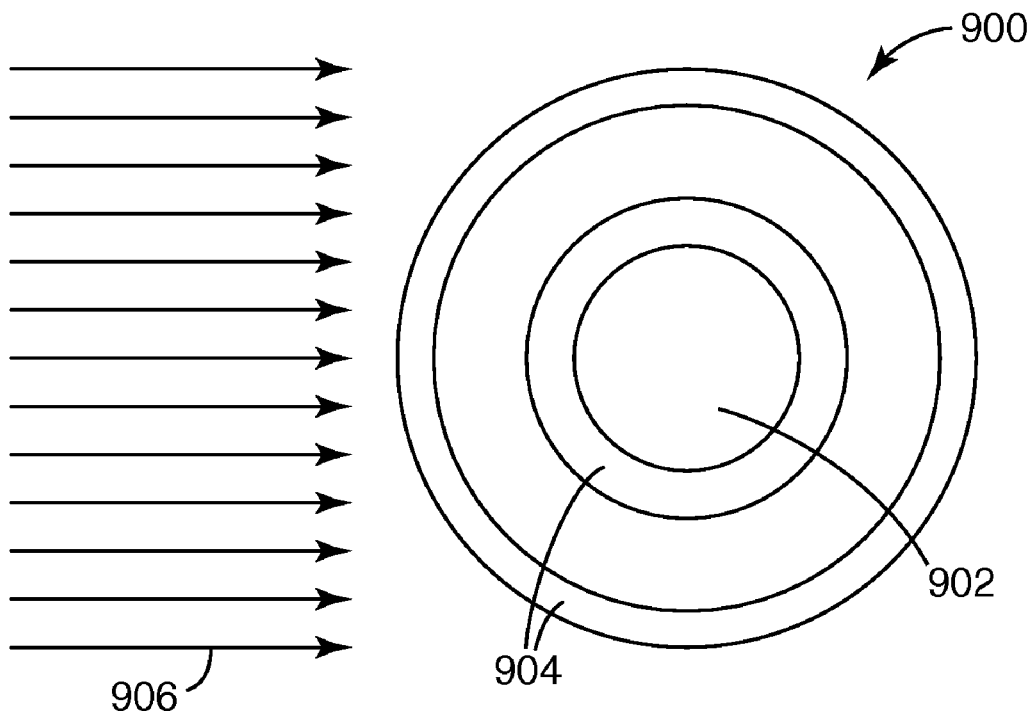
FIG. 9 schematically illustrates parameters of a model used for analyzing behavior of a multilayer polarizing fiber.
Figure 10A:
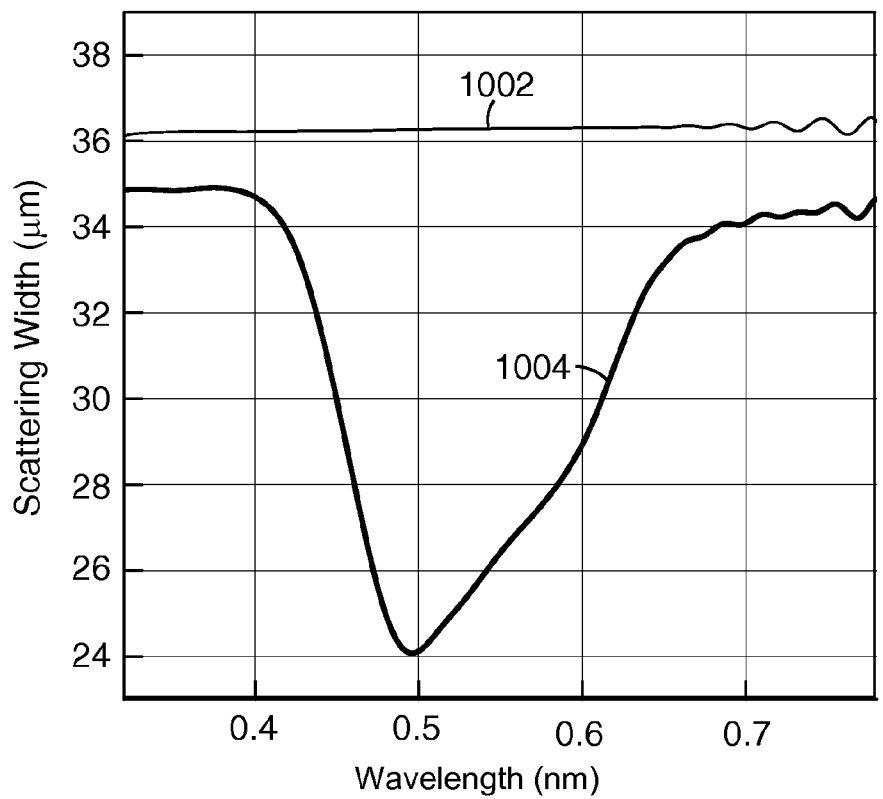
FIGS. 10A and 10B present graphs showing transmission and reflection from multilayer polarizing fibers having a layer thickness gradient of decreasing layer thickness with increasing radius.
Figure 10B:
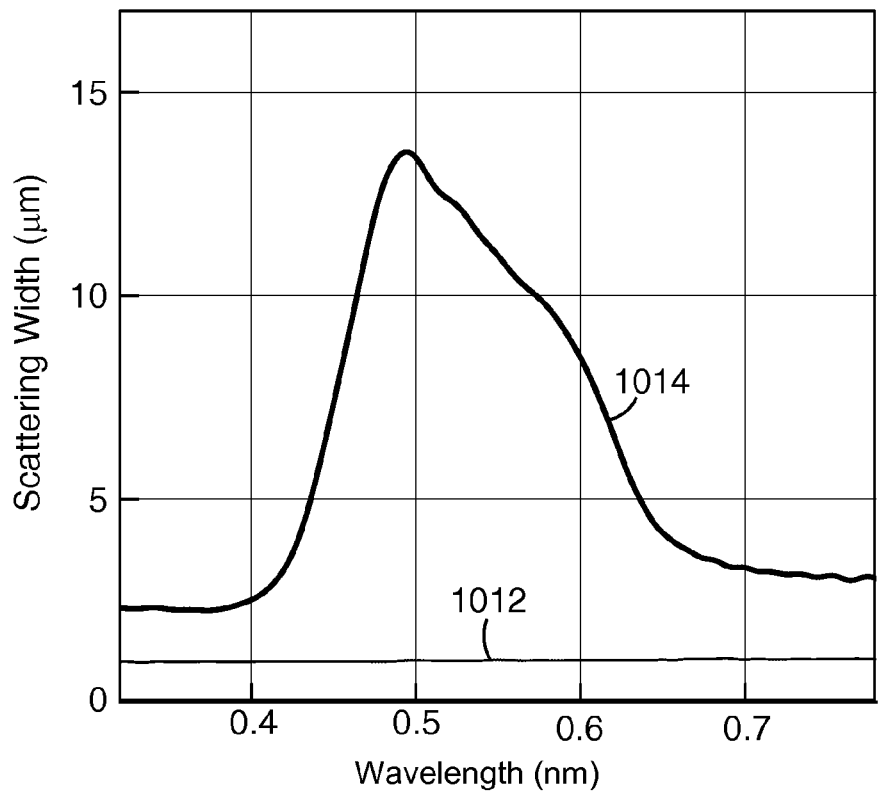

Another approach to reducing the blue shift effect is to set the appropriate direction for the gradient in layer thickness. This approach is described further with respect to FIGS. 9-11. A full-wave numerical model was developed to explore scattering (reflection) of light by a concentric, multilayer polarizing fiber. The model is shown in FIG. 9. The fiber 900 was assumed to have a core of 10 µm and was formed with fifty quarter-wavelength layers of one material interlaced with fifty quarter-wavelength layers of another material. The optical thicknesses of the material layers ranged linearly as quarter-wave layers for wavelengths ranging from 500 nm to 600 nm. The light was incident in the direction shown and the scattering cross-sections for reflectivity and transmission were calculated for the entire fiber width, over the wavelength range 300 nm-800 nm. The scattering cross-sections were calculated for light in both polarization states, the pass and the block polarization states. FIGS. 10A and 10B present the results calculated for a fiber having layers arranged with the thicker layers closer to the core and the thinner layers closer to the outside of the fiber. Curve 1002 represents the transmission for light polarized in the pass state for the fiber. The transmission through the fiber is relatively flat across the entire spectrum. Curve 1004 represents the transmission through the fiber for light polarized in the block state of the fiber. The curve shows that transmission through the fiber is relatively high for wavelengths below about 400 nm and above about 650 nm, and is severely reduced for wavelengths between about 400 nm and 650 nm. This behavior is expected: since the multilayer stack is a quarter-wave stack for wavelengths in the range 500-600 nm, the effectiveness of the fiber is relatively poor outside this range.

Curve 1012, in FIG. 10B, represents the reflection for light polarized in the pass state for the fiber. The reflection is low across the entire spectrum, as would be expected given the high transmission shown in FIG. 1A. Curve 1014 represents the reflection by the fiber for light polarized in the block state of the fiber. The curve is substantially the complement of curve 1004. As can be seen from these graphs, even though the layer thickness changes uniformly from a quarter-wave at 500 nm to 600 nm, the reflectivity is peaked at a wavelength slightly below 500 nm and the reflectivity decreases monotonically between 500 nm and 600 nm. This is a result of the blue shift of the reflectivity spectrum for light incident at the fiber at non-normal angles.

Figure 11A:
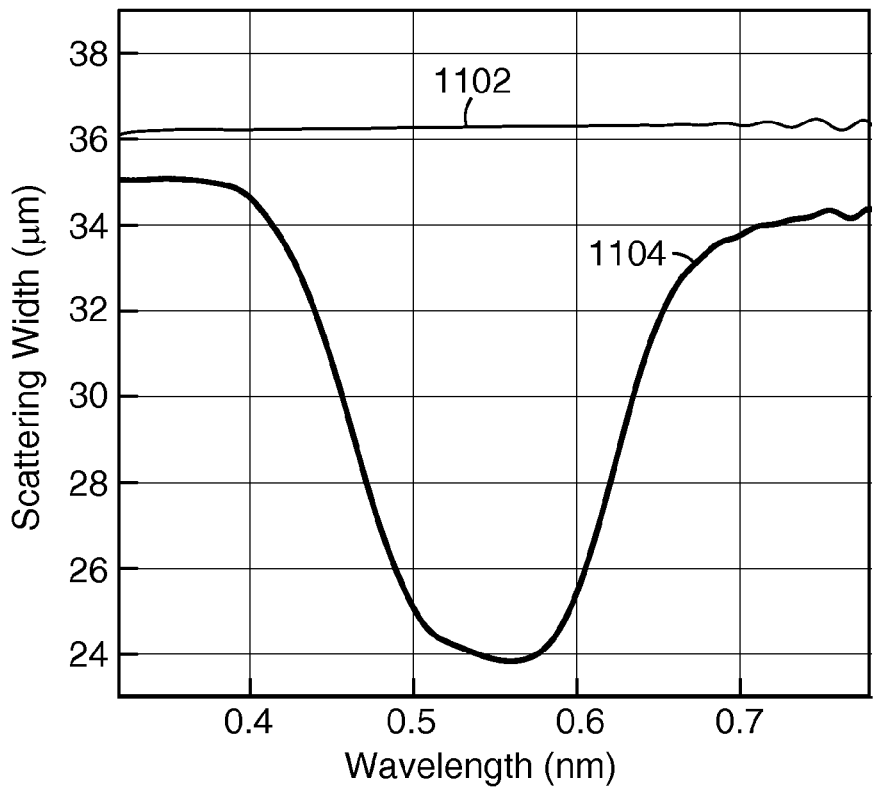
FIGS. 11A and 11B present graphs showing transmission and reflection from multilayer polarizing fibers having a layer thickness gradient of increasing layer thickness with increasing radius.
Figure 11B:
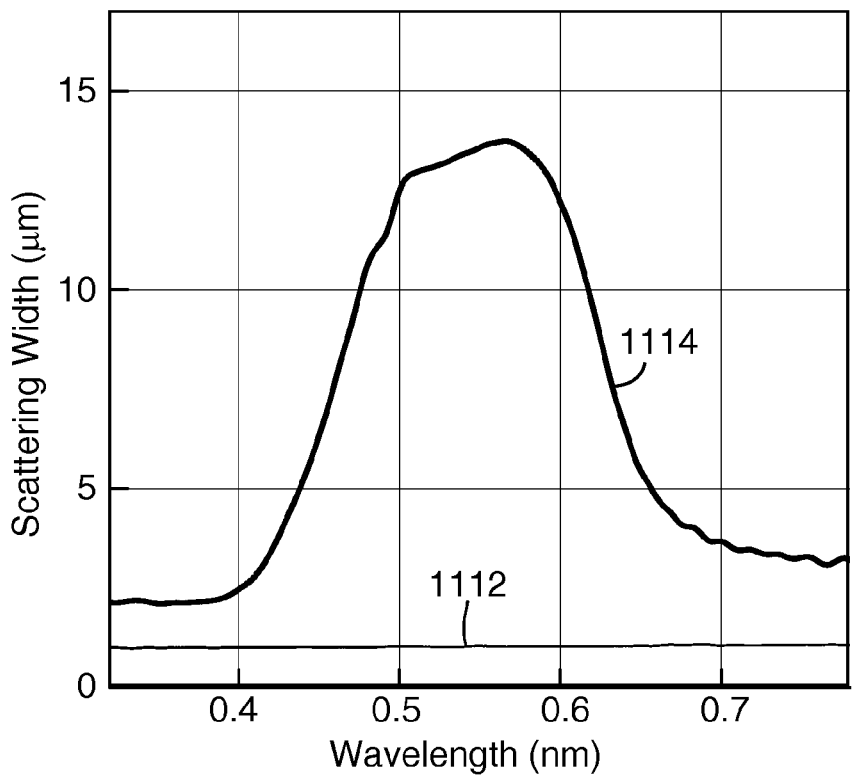

The behavior of the fiber is different when the gradient in layer thickness is reversed, and the thinner layers are closer to the fiber core and the thicker layers are closer to the outside of the fiber. Curve 1102 in FIG. 11A shows the transmission for light polarized in the pass state for the fiber while curve 1104 represents the transmission through the fiber for light polarized in the block state of the fiber. Curve 1112, in FIG. 11B, represents the reflection for light polarized in the pass state for the fiber. Curve 1114 represents the reflection by the fiber for light polarized in the block state of the fiber. The curve 1114 is substantially the complement of curve 1104. The reflectivity of the fiber having the thinner layers towards the fiber core is significantly more uniform over the range 500-600 nm then when the thicker layers are towards the fiber core, which results in improved polarization characteristics in the polarizer. It is believed that this improvement arises from a more proper matching of incidence angle to reflection spectrum. The layers at the fiber edge have a high angle reflection spectrum that is more properly centered about the intended design wavelengths for the reflection band, while the layers at the fiber core have a normal reflection spectrum that is similarly more properly centered about the intended design wavelengths.

Figure 12A:
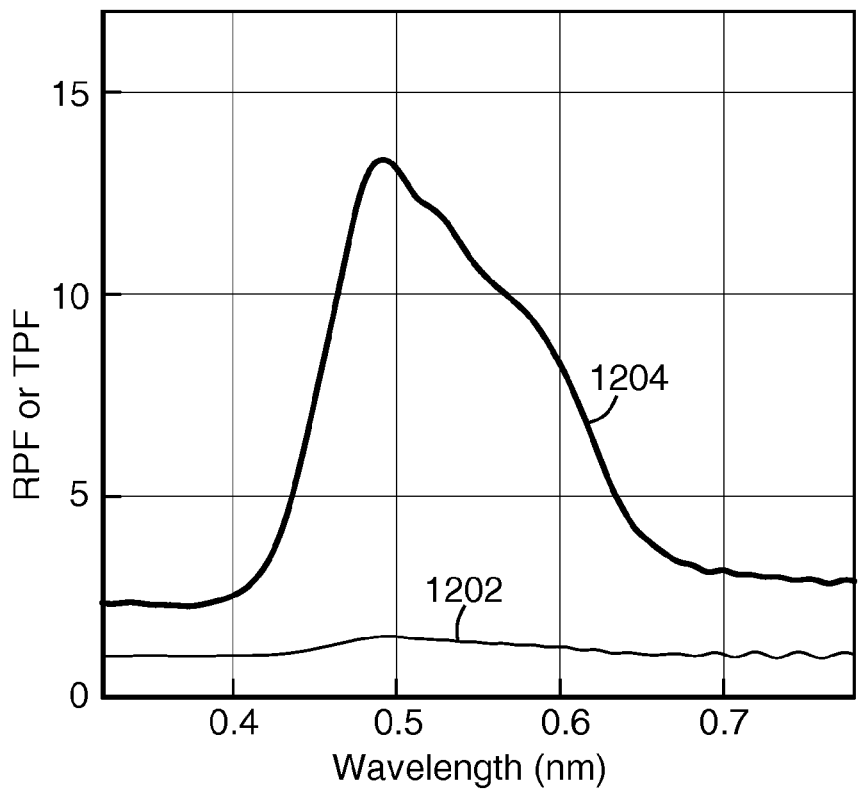
FIG. 12A presents a graph showing polarizing characteristics of a multilayer polarizing fiber having a layer thickness gradient of decreasing layer thickness with increasing radius.
Figure 12B:
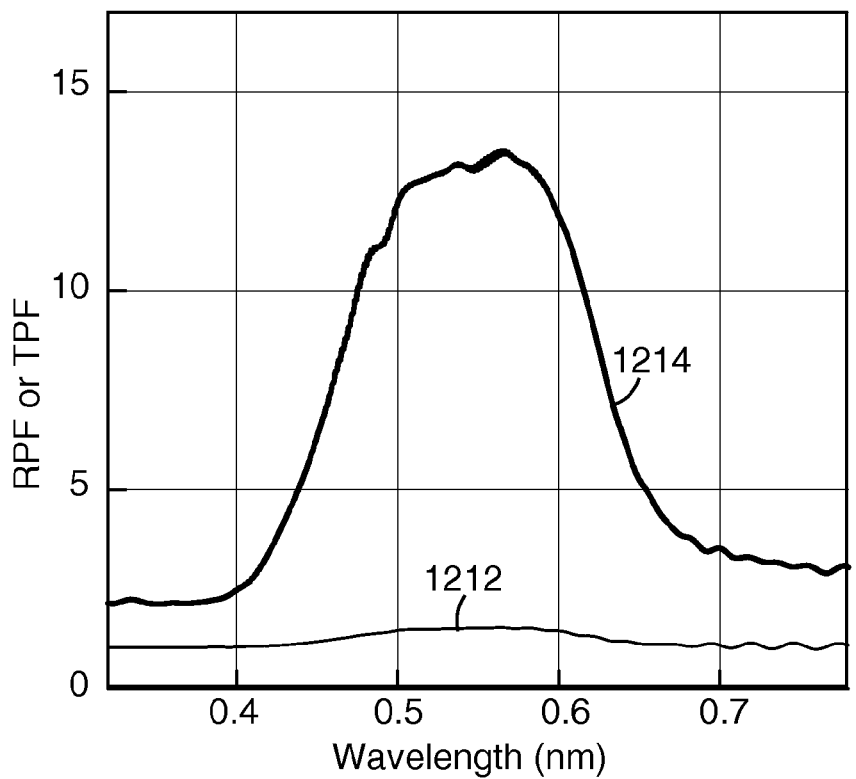
FIG. 12B presents a graph showing polarizing characteristics of a multilayer polarizing fiber having a layer thickness gradient of decreasing layer thickness with increasing radius.

The ratio of the forward scattered light polarized perpendicular to the fiber to the forward scattered light polarized parallel to the fiber is referred to as the Transmission Polarization Function (TPF). The ratio of the backward scattered light polarized parallel to the fiber to the backward scattered light polarized perpendicular to the fiber is referred to as the Reflection Polarization Function (RPF). FIG. 12A shows the value of TPF (curve 1202) and RPF (curve 1204) as a function of wavelength for the case where the thickness of the fiber layers reduces with increasing radius. FIG. 12B shows the values TPF (curve 1212) and RPF (curve 1214) function of wavelength for the case where the thickness of the fiber layers increases with increasing radius. The RPF curve 1202 shows the same sloped behavior between 500 nm and 600 nm as the reflection spectrum in FIG. 10B, while the RPF curve 1212 shows the same substantially uniform behavior as the reflection spectrum in FIG. 11B over the same range. Thus, the polarization characteristics of a multilayer fiber having a graded layer thickness are more uniform when the layer thickness increases with radius.

Figure 13:
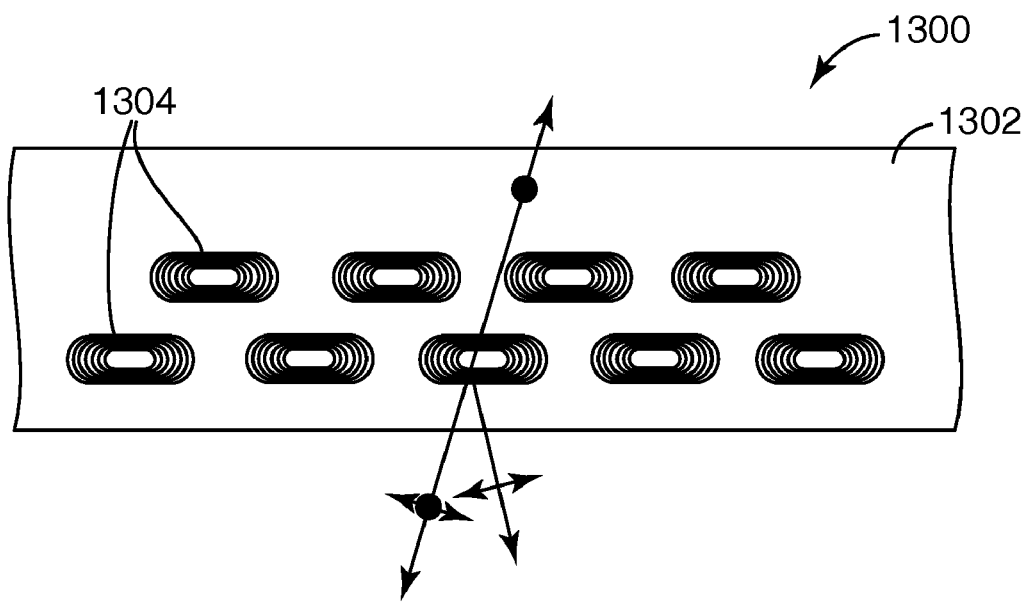
FIG. 13 schematically illustrates a cross-sectional view of a fiber polarizer where the fibers have a non-circularly symmetric cross-section with a longer dimension parallel to the surface of the polarizer.

Another approach to reducing the effect of the blue shift on the characteristics of a polarizer is to use fibers that present less cross-sectional area to the incident light in which the fibers are at a high angle of incidence and present more cross-sectional area where the fibers are at a low angle of incidence. One way of achieving this is to use fibers whose cross-section is elongated in one direction relative to the other, for example as shown in FIGS. 5B and 5C. An example of such a polarizer 1300 is schematically illustrated in FIG. 13. The fibers 1304 are embedded within a matrix 1302. The fibers 1304 are elongated in a direction parallel to the surface of the polarizer 1300. This configuration presents more fiber surface area to incident light that is at a low angle of incidence than, for example, fibers having a circular cross-section.

Example

Single Fiber

A multilayer concentric polarizing fiber was fabricated using the following process. A filament consisting of multiple, alternating concentric rings of an X polymer and a Y polymer was produced by using a die that consisted of 952 shims that were each 0.005" (125 µm) thick. Two shims are used to produce a ring so this 952 shim die was designed to produce a filament consisting of 476 rings. Half of these rings were made from the X polymer and half from the Y polymer. This die had two inlet ports; one for the molten X polymer and one for the molten Y polymer.

The X polymer was LMPEN, a copolymer made from 90% PEN/10% PET, available from 3M Company. The Y polymer was one of the following substantially isotropic materials:

i) Eastar 6763 PETG from Eastman Chemical Company, Kingsport Tenn.;

ii) SA115 PC/PCT-G blend from Eastman Chemical Company;

iii) Xylex 7200 PC/PCCT-G blend from G.E. Plastics, Pittsfield, Mass.; and iv) NAS 30 PS/PMMA blend from Nova Chemicals Corporation, Calgary, Alberta, Canada.

The number of layers formed can be controlled by varying the number of shims in the die and by varying process conditions such as flow rate and temperature. The design of shims in the stack can be varied to adjust the thickness profile of the fiber rings. The shims in the spinneret pack were formed using laser-cutting. The fiber die was specially designed to provide a layer thickness gradient and layer thickness ratios that would result in broadband visible Bragg interference reflection after a specific forming and stretching process.

Solidified pellets of the two polymers were separately fed to one of two twin screw extruders. These extruders operated at temperatures ranging from 260° C.-300° C. and at screw speeds ranging from 40-70 rpm. Typical extrusion pressures ranged from about $2.1 \times 10^6$ Pa to about $2.1 \times 10^7$ Pa. Each extruder was equipped with a metering gear pump which supplied a precise amount of molten polymer to the filament spinning die. The size of each metering gear pump was 0.16 cc/revolution and these gear pumps were generally operated at identical speeds ranging from 10-80 rpm. The molten polymer was transferred from the metering pumps to the die using heated, stainless steel neck tubes.

The molten polymer streams entered the die and flowed through the shims. The first shim pair created the core of the filament, the second shim pair formed the first ring around the core, the third shim pair formed the second ring on the outside of the first ring, and so on and so forth until up to 476 rings had been formed. This molten, multiring filament then exited the die and was quenched in a tank of water. The filament was drawn into the water using a pull roll. The filament exited the pull roll and was wound onto a core using a level winder. The combination of the metering pump speed and the winding speeds controls the diameters of the filament. Typical speeds for this process ranged from about 0.5 $ms^{-1}$-4 $ms^{-1}$.

After extrusion, the multilayer fibers were stretched and oriented to develop birefringence and reflective polarizing properties and to reduce the layer thicknesses to the appropriate size (approximately one quarter wavelength optical thickness for visible light).

In this step the filament was unwound and fed to a pull roll station, then onto a heated, cantilevered platen, and then to another pull roll station, and finally to a winder. The platen temperature generally ranged from 120° C.-182° C. The second pull roll station generally ran about 6-8 times the speed of the first pull roll station and caused the filament to be stretched as it was heated on the platen. The typical speed of the first pull roll station was about 0.2 $ms^{-1}$ while the second pull roll station ranged from 1.2 $ms^{-1}$-1.6 $ms^{-1}$. The winder ran the same speed as the second pull roll station.

Figure 14:
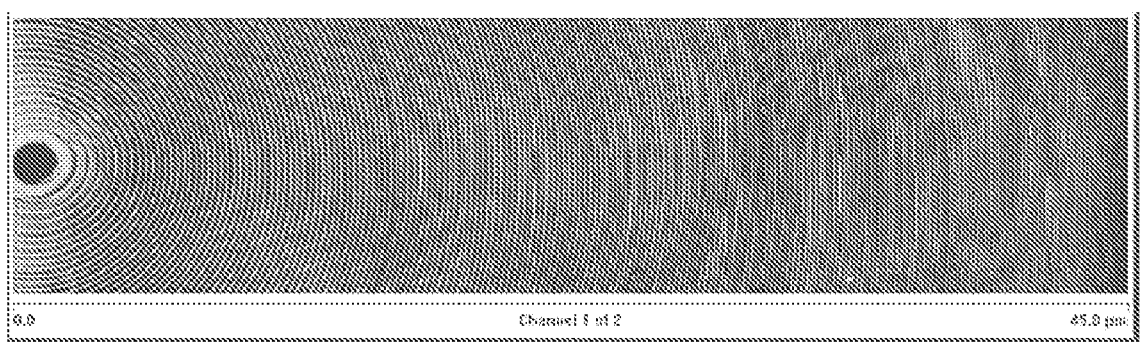
FIG. 14 shows a photograph of a partial cross-sectional view of a multilayer polarizing fiber.

A partial cross-sectional view of a fiber manufactured using the technique just described is shown in FIG. 14. The fiber had about 400 layers of alternating material with a designed layer thickness profile and gradient resulting in broadband polarized coherent reflection. This fiber used Xylex as polymer Y. The very good short-range order and uniformity is important in realizing coherent reflection, which reduces the interaction length of light with the fiber materials, minimizing the opportunity for light absorption and thus maximizing efficiency.

A technique was developed to measure the polarization selectivity of a single drawn fiber. The forward and backward scattered light from a laser (less a 7° cone from the optical axis) were measured for light polarized parallel to the fiber and for light polarized perpendicular to the fiber. The values of TPF and RPF for a multilayer polarizing fiber were measured to be 2.3 and 5.6 at 543.5 nm respectively. The RPF and TPF of an isotropic fiber are between 1 and 2. This demonstrates clear polarization-selective reflection and scattering from a single fiber.

Example

Naked Fiber Array

Figure 15:
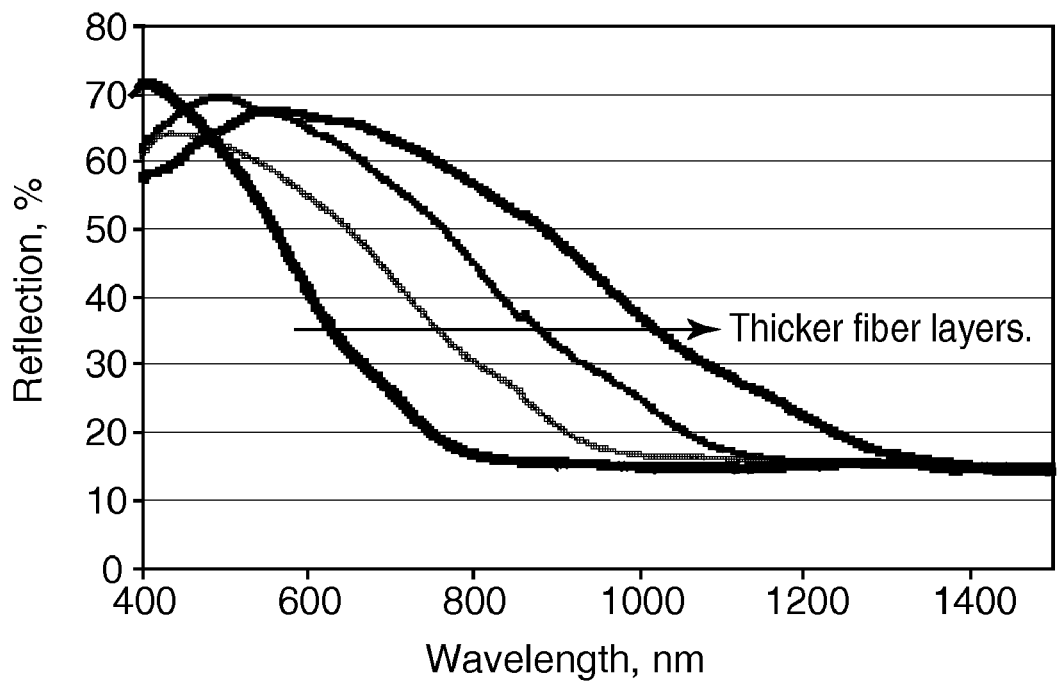
FIGS. 15 and 16 respectively show graphs of reflection and transmission measured for multilayer polarizing fibers of different layer thicknesses.
Figure 16:
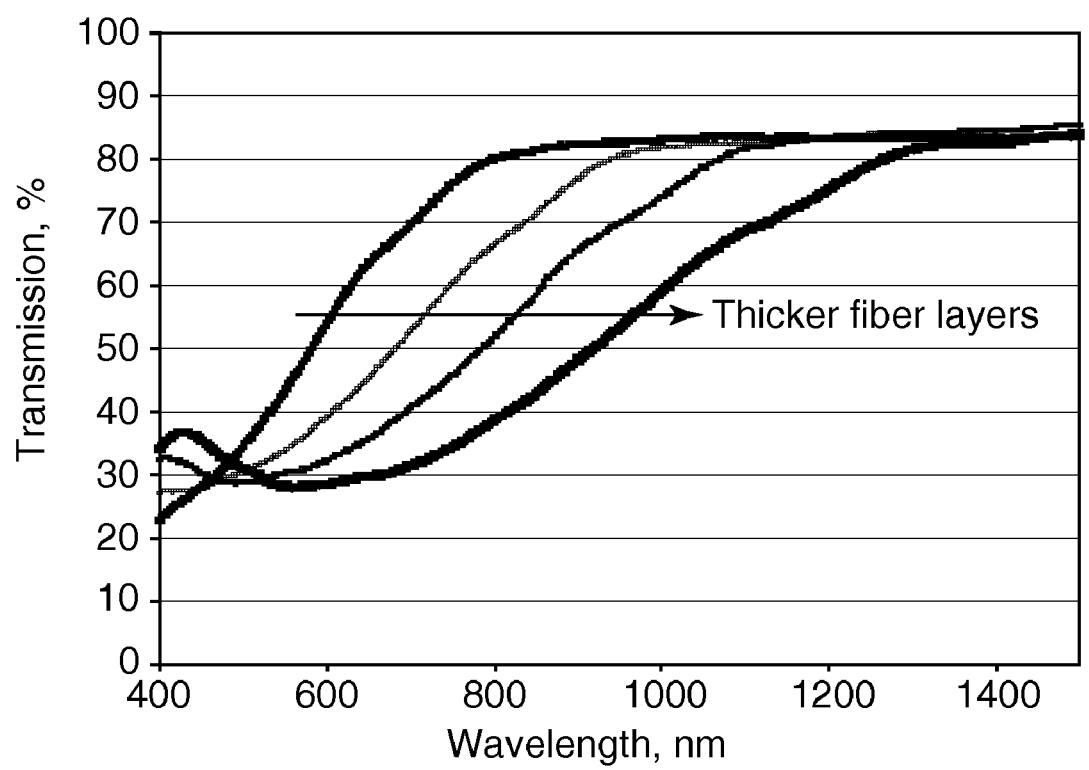

Arrays of naked fibers made using the above method were analyzed over a broad wavelength band to characterize the optical properties of drawn fibers. The fiber arrays, suspended in air, were analyzed for broadband polarized transmission and reflection in a PerkinElmer UV-Vis spectrometer, using an integrating sphere to capture substantially all of the transmitted or reflected light. Results from a series of fibers are shown in FIGS. 15 and 16. These figures not only demonstrate the polarization-selective reflection of the drawn fibers, but they also demonstrate the ability to shift the reflection band of the block state polarization by changing the fiber layer thickness. The correspondence between the increasing fiber layer thicknesses and the increasing wavelengths of reflection (combined with the relatively invariant reflection of the pass axis polarization) are a clear indication of coherent interference-based reflection from the multilayer fiber structure.

Further, these results demonstrate that the fibers can be used even in an unencapsulated state to create a reflective polarizer. Thus, arrays or fabrics of the fibers may be made into reflective polarizing articles without using an encapsulating resin matrix. These fiber cloths or arrays could have some advantages in that they provide some diffusion for light in the pass state polarization, with high transmission for the pass state due to Brewster's angle effects at the fiber surfaces, in some cases. Regardless of whether the fibers are encapsulated or not, they can be combined with isotropic fiber woven in the cross-direction in a variety of weaves, such as basket, leno, twill, etc.

FIG. 15 shows reflection, while FIG. 16 shows transmission, for an array of fibers drawn from LMPEN and PETG materials using very similar process conditions for all fibers, but varying the winder speed during the extrusion forming step to change the fiber layer thicknesses. Each fiber had multiple layers of uniform optical thickness. Thicker fibers had thicker layers and a corresponding shift of reflection and transmission bands to longer wavelengths, clearly demonstrating coherent interference-based reflection as well as polarization selectivity. The pass-state spectra were all substantially invariant and are omitted from the graphs.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. An optical body, comprising:
   a first multilayered fiber comprising layers of at least a first and a second polymer material, layers of the first polymer material being disposed between layers of the second polymer material, at least one of the first and second polymer materials being birefringent;
   wherein at least a first layer of the first polymer material has a first thickness different from a second layer of the first polymer material.

2. An optical body as recited in claim 1, wherein the layers are in one of a stack and a concentric arrangement.

3. An optical body as recited in claim 1, wherein the layers of the first and second polymer materials are arranged with respective gradients in optical layer thickness, with the layer thickness increasing for layers increasingly spaced from the origin of the fiber.

4. An optical body as recited in claim 1, wherein the layers of the first and second polymer materials are arranged with respective gradients in optical layer thickness, with the layer thickness decreasing for layers increasingly spaced from the origin of the fiber.

5. An optical body as recited in claim 4, wherein the gradients are linear.

6. An optical body as recited in claim 4, wherein the gradients are nonlinear.

7. An optical body as recited in claim 1, wherein at least a first layer of the first polymer material associated with a first distance from the fiber origin i) has a greater optical thickness than the optical thickness of a second layer of the first polymer material having a second distance from the fiber origin smaller than the first distance radius and ii) has a greater optical thickness than the optical thickness of a third layer of the first polymer material having a third distance from the fiber origin greater than the first distance.

8. An optical body as recited in claim 1, wherein at least a first layer of the first polymer material associated with a first distance from the fiber origin i) has a smaller optical thickness than the optical thickness of a second layer of the first polymer material having a second distance from the fiber origin smaller than the first distance and ii) has a smaller optical thickness than the optical thickness of a third layer of the first polymer material having a third distance from the fiber origin greater than the first distance.

9. An optical body as recited in claim 1, wherein layers of the first and second polymer materials are arranged in packets of substantially equal optical thickness, each packet associated with a respective range of distance from the fiber origin.

10. An optical body as recited in claim 9, wherein the optical thickness associated with respective packets of layers changes approximately linearly with distance from the fiber origin.

11. An optical body as recited in claim 9, wherein the optical thickness associated with respective packets of layers alternately increases and decreases with increasing distance from the fiber origin.

12. An optical body as recited in claim 1, wherein at least some of the first and second polymer layers have thicknesses corresponding to quarter-wave thicknesses for light in the wavelength range of approximately 400 nm 700 nm.

13. An optical body as recited in claim 12, wherein at least some of the polymer layers have thicknesses corresponding to the quarter-wave thicknesses for light having a wavelength longer than 700 nm.

14. An optical body as recited in claim 1, further comprising a coating layer surrounding the first multilayered fiber.

15. An optical body as recited in claim 14, wherein the coating layer comprises a layer of one of the first and second polymer materials.

16. An optical body as recited in claim 14, wherein the coating layer comprises a layer of a third polymer material having a refractive index less than the refractive indices of the first and second polymer materials.

17. An optical body as recited in claim 1, further comprising a polymer matrix, the first multilayered fiber being embedded within the polymer matrix, and further comprising at least second and third multilayered fibers embedded within the polymer matrix.

18. An optical body, comprising:
   a first multilayered fiber comprising layers of at least a first and a second polymer material, layers of the first polymer material being disposed between layers of the second polymer material, at least one of the first and second polymer materials being birefringent;
   wherein at least some of the layers of first and second polymer materials have a thickness selected as a quarter-wavelength thickness for light having a wavelength of more than 700 nm, and further wherein a second set of the layers of first and second polymer materials have a thickness selected as a quarter-wavelength thickness of light in the wavelength range of about 400 nm-700 nm.

19. An optical body as recited in claim 18, wherein the second set of layers is positioned closer to the center of the first multilayered fiber than the first set of layers.

20. An optical body as recited in claim 18, wherein the layers are in one of a stack and a concentric arrangement.

21. An optical body as recited in claim 18, further comprising a coating layer surrounding the first multilayered fiber.

22. An optical body as recited in claim 21, wherein the coating layer comprises a layer of one of the first and second polymer materials.

23. An optical body as recited in claim 21, wherein the coating layer comprises a layer of a third polymer material having a refractive index less than the refractive indices of the first and second polymer materials.

24. An optical body as recited in claim 18, further comprising a polymer matrix, the first multilayered fiber being embedded within the polymer matrix and further comprising at least second and third multilayered fibers embedded within the polymer matrix.

25. An optical body as recited in claim 18, wherein the layers of the first and second polymer materials are arranged with respective gradients in optical layer thickness, with the layer thickness increasing for layers increasingly spaced from the origin of the fiber.

26. An optical body as recited in claim 18, wherein the layers of the first and second polymer materials are arranged with respective gradients in optical layer thickness, with the layer thickness decreasing for layers increasingly spaced from the origin of the fiber.

27. An optical body as recited in claim 18, wherein layers of the first and second polymer materials are arranged in packets of substantially equal optical thickness, each packet associated with a respective range of distance from the fiber origin.

28. An optical body as recited in claim 27, wherein the optical thickness associated with respective packets of layers changes approximately linearly with distance from the fiber origin.

29. An optical body as recited in claim 27, wherein the optical thickness associated with respective packets of layers alternately increases and decreases with increasing distance from the fiber origin.

* * * * *

UNITED STATES PATENT AND TRADEMARK OFFICE
CERTIFICATE OF CORRECTION

| | | |
|---|---|---|
| PATENT NO. | : 7,773,834 B2 | Page 1 of 1 |
| APPLICATION NO. | : 11/468746 | |
| DATED | : August 10, 2010 | |
| INVENTOR(S) | : Andrew John Ouderkirk et al. | |

It is certified that error appears in the above-identified patent and that said Letters Patent is hereby corrected as shown below:

<u>Page 3,</u>
Column 2 (Other Publications), Line 29, Delete "Microgibrillar" and insert -- Microfibrillar --, therefor.

<u>Column 2,</u>
Line 26, Delete "5A-5H" and insert -- 5A-5F --, therefor.

<u>Column 4,</u>
Line 46, Delete "$|n_{1y} - n_{2y}.$" and insert -- $|n_{1y} - n_{2y}|$ --, therefor.

<u>Column 16,</u>
Line 4, Delete "FIG. 1A." and insert -- FIG. 10A. --, therefor.

<u>Column 20,</u>
Line 12, In Claim 12, delete "400 nm 700 nm." and insert -- 400 nm-700 nm. --, therefor.

Signed and Sealed this
Twenty-first Day of June, 2011

David J. Kappos
*Director of the United States Patent and Trademark Office*